(12) United States Patent
Bagheri et al.

(10) Patent No.: US 11,871,411 B2
(45) Date of Patent: Jan. 9, 2024

(54) METHOD AND APPARATUS FOR DOWNLINK DATA TRANSMISSIONS

(71) Applicant: Motorola Mobility LLC, Chicago, IL (US)

(72) Inventors: Hossein Bagheri, Urbana, IL (US); Ravikiran Nory, Buffalo Grove, IL (US); Vijay Nangia, Woodridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/966,883

(22) Filed: Oct. 16, 2022

(65) Prior Publication Data

US 2023/0049689 A1    Feb. 16, 2023

Related U.S. Application Data

(63) Continuation of application No. 17/207,585, filed on Mar. 19, 2021, now Pat. No. 11,510,232, which is a
(Continued)

(51) Int. Cl.
*H04W 72/12* (2023.01)
*H04W 72/1273* (2023.01)
(Continued)

(52) U.S. Cl.
CPC ..... *H04W 72/1273* (2013.01); *H04W 72/044* (2013.01); *H04W 72/0446* (2013.01);
(Continued)

(58) Field of Classification Search
CPC ........... H04W 72/1273; H04W 72/042; H04W 72/044; H04W 72/0446; H04W 72/1278;
(Continued)

(56) References Cited

U.S. PATENT DOCUMENTS

| 2021/0168795 | A1* | 6/2021 | Yang | H04L 5/0048 |
| 2021/0337495 | A1* | 10/2021 | Abotabl | H04L 5/0082 |
| 2022/0038921 | A1* | 2/2022 | Wu | H04L 1/1893 |

OTHER PUBLICATIONS

Qualcomm Incorporated, NPL document, "Downlink Design for shortened TTI" Oct. 9, 2016 (Year: 2018).*
(Continued)

*Primary Examiner* — Mewale A Ambaye
(74) *Attorney, Agent, or Firm* — Loppnow & Chapa; Matthew C. Loppnow

(57) ABSTRACT

A first resource assignment can be transmitted in a first TTI. First downlink user data corresponding to at least a first transport block in the first TTI in a first set of resources for receiving a first portion of a first downlink user data and second set of resources receiving a second portion of the first downlink user data can be transmitted. The second set of resources can be configured for DCI and can be used instead for downlink user data and the second set of resources may not overlap with the first set of resources. A second resource assignment in a second TTI can be transmitted. Second downlink user data corresponding to at least a second transport block can be transmitted. The second downlink user data can be transmitted in the second TTI in third and fourth sets of resources.

14 Claims, 15 Drawing Sheets

Related U.S. Application Data continuation of application No. 16/702,459, filed on Dec. 3, 2019, now Pat. No. 10,986,656, which is a continuation of application No. 15/936,308, filed on Mar. 26, 2018, now Pat. No. 10,524,284.

(60) Provisional application No. 62/476,666, filed on Mar. 24, 2017.

(51) Int. Cl.
*H04W 72/044* (2023.01)
*H04W 72/23* (2023.01)
*H04W 72/0446* (2023.01)
*H04L 5/00* (2006.01)

(52) U.S. Cl.
CPC ........... *H04W 72/23* (2023.01); *H04L 5/0044* (2013.01); *H04L 5/0051* (2013.01); *H04L 5/0053* (2013.01); *H04L 5/0091* (2013.01)

(58) Field of Classification Search
CPC .......... H04W 72/0426; H04W 72/0453; H04L 5/0044; H04L 5/0051; H04L 5/0053; H04L 5/0091
See application file for complete search history.

(56) References Cited

OTHER PUBLICATIONS

Huawei Inc, NPL document, "Details for two-level DC schemes for short TTI" Oct. 9, 2016 (Year: 2016).*

LG, NPL document, "Discussion on sPDSCH and DMRS design" Reno, USA Nov. 14-18, 2016 (Year: 2016).*

* cited by examiner

METHOD AND APPARATUS FOR DOWNLINK DATA TRANSMISSIONS

BACKGROUND

1. Field

The present disclosure is directed to a method and apparatus for communicating on a wireless network. More particularly, the present disclosure is directed to downlink data transmissions on a wireless network.

2. Introduction

Presently, wireless communication devices, such as user equipment, communicate with other communication devices using wireless signals. In current Third Generation Partnership Project Long Term Evolution (3GPP LTE), time-frequency resources are divided into subframes where each 1 ms subframe includes two 0.5 ms slots and each slot with normal Cyclic Prefix (CP) duration comprises 7 Single Carrier Frequency Division Multiple Access (SC-FDMA) symbols in the time domain in Uplink (UL) and 7 Orthogonal Frequency Division Multiplexing (OFDM) symbols in the time domain in Downlink (DL). In the frequency domain, resources within a slot are divided into Physical Resource Blocks (PRBs), where each resource block spans 12 contiguous subcarriers.

In current LTE systems, usually resources are assigned using a 1 ms minimum Transmission Time Interval (TTI) when data is available, referred to as dynamic scheduling. Within each scheduled TTI, in the UL, a User Equipment (UE) transmits data over a Physical Uplink Shared Channel (PUSCH) in PRB-pairs indicated by an UL grant to the UE that schedules the data transmission. In the DL, the base station, such as an enhanced NodeB (eNB), transmits data over a Physical Downlink Shared Channel (PDSCH) in PRB-pairs indicated by a DL grant/assignment. The UL grant and/or DL assignment information is provided to the UE in a control channel, referred to as a (Enhanced) Physical Downlink Control Channel (PDCCH or EPDCCH). The (E)PDCCH channel carries the control information about the data being transmitted on the current subframe and the information about the resources which UE need to use for the uplink data.

There are two types of downlink physical layer control signaling for the purpose of dynamic scheduling, the PDCCH and the EPDCCH. With PDCCH, the control signaling from an eNodeB is received by the UE in the first, first two, or first three, or first four symbols of a subframe subsequently referred to as control symbols. The remaining symbols in the subframe, following the control symbols, are typically used for receiving user data. User data is received by the UE on the Physical Downlink Shared Channel (PDSCH), and in select Resource Blocks (RBs) of the PDSCH occupying either in the entire carrier bandwidth or a portion of it.

The set of PDCCH candidates to monitor are defined in terms of search spaces, where a search space $S_k^{(L)}$ at Aggregation Level (AL) $L \in \{1,2,4,8\}$ is defined by a set of PDCCH candidates. For each serving cell on which PDCCH is monitored, the Control Channel Elements (CCEs) corresponding to a PDCCH candidate of the search space $S_k^{(L)}$ are given by a formula. The formula uses parameters including a total number of CCEs in the control region of subframe, such as, derived from reduction of Physical Control Format Indicator Channel (PCFICH) and Physical Hybrid-ARQ Indicator Channel (PHICH) resources, including an AL, including a number of PDCCH candidates to monitor in the given search space, and including a slot number within the radio frame.

A physical control channel is transmitted on an aggregation of one or several consecutive CCEs, where a CCE corresponds to 9 resource element groups. Each CCE is equivalent to 36 resource elements (REs). One CCE is the minimum PDCCH allocation unit.

The number of resource-element groups not assigned to PCFICH or PHICH is $N_{REG}$. The CCEs available in the system are numbered from 0 to $N_{CCE}-1$, where $N_{CCE}=\lfloor N_{REG}/9 \rfloor$. A PDCCH consisting of n consecutive CCEs may only start on a CCE fulfilling i mod n=0, where i is the CCE number.

With EPDCCH, for each serving cell, higher layer signaling can configure a UE with one or two EPDCCH-PRB-sets for EPDCCH monitoring. The PRB-pairs corresponding to an EPDCCH-PRB-set are indicated by higher layers. Each EPDCCH-PRB-set consists of set of ECCEs numbered from 0 to $N_{ECCE,p,k}-1$ where $N_{ECCE,p,k}$ is the number of ECCEs in EPDCCH-PRB-set p of subframe k. Each EPDCCH-PRB-set can be configured for either localized EPDCCH transmission or distributed EPDCCH transmission.

For each serving cell, the subframes in which the UE monitors EPDCCH UE-specific search spaces are configured by higher layers. A UE shall monitor a set of (E)PDCCH candidates for control information, where monitoring implies attempting to decode each of the (E)PDCCH decoding candidates in the set according to the monitored Downlink Control Information (DCI) formats. The set of (E)PDCCH candidates to monitor are defined in terms of (E)PDCCH search spaces.

There is still room for improvement for reducing the latency of communication.

BRIEF DESCRIPTION OF THE DRAWINGS

In order to describe the manner in which advantages and features of the disclosure can be obtained, a description of the disclosure is rendered by reference to specific embodiments thereof which are illustrated in the appended drawings. These drawings depict only example embodiments of the disclosure and are not therefore to be considered to be limiting of its scope. The drawings may have been simplified for clarity and are not necessarily drawn to scale.

DETAILED DESCRIPTION

Figure 1:
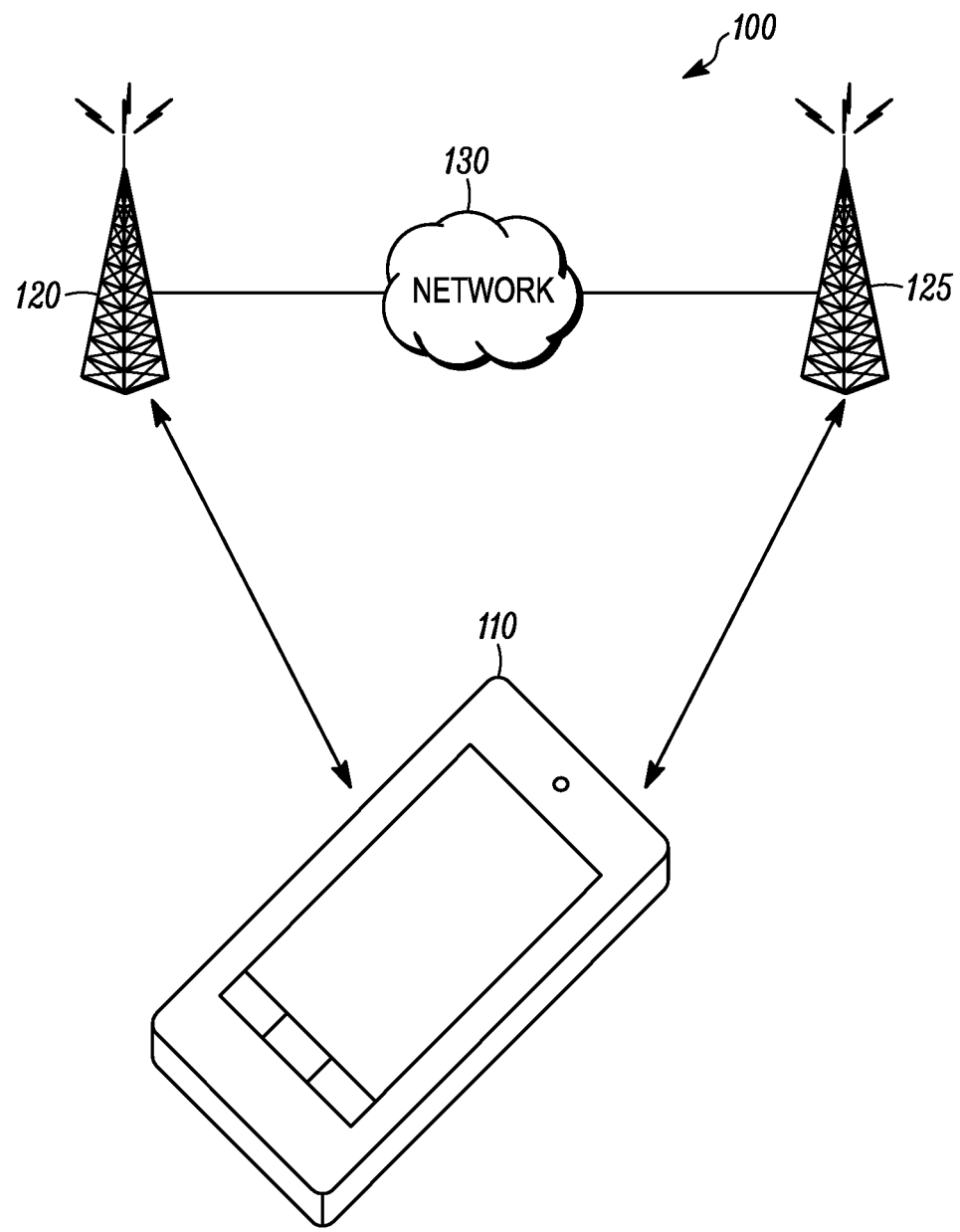
FIG. 1 is an example block diagram of a system according to a possible embodiment.

Embodiments provide a method and apparatus for receiving downlink data transmissions on a wireless network. According to a possible embodiment, a resource allocation assignment for a set of scheduled TTIs can be received from a network in a first TTI belonging to the set of scheduled TTIs. A first set of resources for receiving a first portion of a first downlink user data in the first TTI can be determined based on the resource allocation assignment. A second set of resources for receiving a second portion of the first downlink user data in the first TTI can be determined based on the resource allocation assignment. The first set and the second set of resources may not overlap. The second set of resources can belong to a resource set configured for downlink control information. The first downlink user data can correspond to at least a first transport block in the first and the second set of resources in the first TTI can be received. A third set of resources for receiving a first portion of a second downlink user data in a second TTI belonging to the set of scheduled TTIs can be determined based on the resource allocation assignment. The third set of resources in the second TTI can be the same as the first set of resources in the first TTI. A fourth set of resources for receiving a second portion of the second downlink user data in the second TTI can be determined based on the resource allocation assignment. The fourth set of resources can be a subset of the second set of resources in the first TTI. The second downlink user data can correspond to at least a second transport block in the third and the fourth set of resources in the second TTI can be received. The second TTI can be subsequent to the first TTI.

According to another possible embodiment, a first resource assignment can be received in a first TTI. A first set of resources for receiving a first portion of a first downlink user data in the first TTI can be determined based on the first resource assignment. A second set of resources for receiving a second portion of the first downlink user data in the first TTI can be determined based on the first resource assignment. The second set of resources can be configured for DCI. The second set of resources may not overlap with the first set of resources. A resource location of a first DMRS associated with the first portion of the first downlink user data in the first set of resources can be determined. A resource location of a second DMRS associated with the second portion of the first downlink user data in the second set of resources can be determined. The first downlink user data can correspond to at least a first transport block can be received from the network in the first TTI in the first and second set of resources. The first portion of the first downlink user data in the first set of resources can be demodulated based on the first DMRS. The second portion of the first downlink user data can be demodulated based on the second DMRS. A second resource assignment can be received in a second TTI. A third set of resources for receiving a first portion of a second downlink user data in the second TTI can be determined based on the second resource assignment. A fourth set of resources for receiving a second portion of the second downlink user data in the second TTI can be determined based on the second resource assignment. The fourth set of resources can be configured for DCI. The fourth set of resources may not overlap with the third set of resources. A resource location of a third DMRS associated with the second portion of the second downlink user data in the fourth set of resources can be determined. The second downlink user data can correspond to at least a second transport block can be received from the network in the second TTI in the third and fourth set of resources. The first portion of the second downlink user data can be demodulated based on the first DMRS. The second portion of the second downlink user data can be demodulated based on at least the third DMRS. The first set of resources in the first TTI can include a first set of resource blocks (RBs) in the first TTI. The second set of resources in the first TTI can include a second set of RBs in the first TTI. The resource set configured for DCI in the first TTI can include at least the second set of RBs. The third set of resources in the second TTI can include a third set of RBs in the second TTI. The fourth set of resources in the second TTI can include a fourth set of RBs in the second TTI.

At least some embodiments can be used to reduce latency of communication in LTE. For example, an approach for future LTE systems can use shorter minimum TTI (sTTI), such as shorter than 1 ms, in UL/DL. Using sTTI can allow the UE to send/receive data using reduced latency when compared to current LTE systems. In addition, acknowledging each or a group containing few sTTI(s) leading to faster, compared to using 1 ms TTI, acknowledging data can help in some applications, such as TCP during slow-start phase for users in good channel conditions. For example, in the TCP slow-start phase for DL communication, the network-UE link capacity for a user in good channel condition can support more data, but the network can send a smaller amount of data because the network is waiting to receive the acknowledgment for the previously sent data due to the TCP slow-start phase. Therefore, faster acknowledgments, such as acknowledgements as a result of using shorter TTI length, can enable the network to better utilize the available network-UE link capacity.

FIG. 1 is an example block diagram of a system 100 according to a possible embodiment. The system 100 can include a User Equipment (UE) 110, at least one network entity 120 and 125, and a network 130. The UE 110 can be a wireless wide area network device, a user device, wireless terminal, a portable wireless communication device, a smartphone, a cellular telephone, a flip phone, a personal digital assistant, a personal computer, a selective call receiver, an Internet of Things (IoT) device, a tablet computer, a laptop computer, or any other user device that is capable of sending and receiving communication signals on a wireless network. The at least one network entity 120 and 125 can be wireless wide area network base stations, NodeBs, enhanced NodeBs (eNBs), 5G or New Radio NodeBs (gNBs), unlicensed network base stations, access points, network entities, base station controllers, network controllers, different types of network entities from each other, or any other network entities that can provide wireless access between a UE and a network.

The network 130 can include any type of network that is capable of sending and receiving wireless communication signals. For example, the network 130 can include a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, a satellite communications network, a high altitude platform network, the Internet, and/or other communications networks.

In operation, the UE 110 can communicate with the network 130 via at least one network entity 120, such as a base station. For example, the UE can send and receive control signals on a control channel and user data signals on a data channel sTTI configurations within a subframe either can be a combination of 6 sTTIs, each including 2 or 3 symbols, such as OFDM symbols in DL or Single Carrier-Frequency Division Multiple Access (SC-FDMA) symbols in UL or can be two 0.5 ms-length sTTIs, such as 7 symbols.

For example, scheduling UE transmission over a sTTI length of 0.5 ms, such as a PUSCH scheduled using a PRB spanning a 0.5 ms in a 1 ms subframe, or scheduling UE transmission over a sTTI length of ~140 us, such as PUSCH scheduled using a shortened PRB spanning 2 SC-FDMA symbols within a slot in a subframe, can not only reduce time taken to start/finish transmitting a data packet, but also potentially reduce the round trip time for possible Hybrid Automatic Repeat Request (HARQ_retransmissions related to that data packet.

A 'subframe' can refer to a time domain container spanning a certain number of OFDM symbols, such as a 1 ms subframe duration. A slot can refer to a fixed number OFDM symbols such as 7 or 14 OFDM symbols. For a numerology with 15 kHz subcarrier spacing, a slot duration of 7 OFDM symbols slot can be 0.5 ms and slot duration of 14 OFDM symbols slot can be 1 ms. For numerology with $2^m*15$ kHz subcarrier spacing, where m can be a scaling factor with $m \in \{-2, 0, 1, \ldots, 5\}$, the slot duration of 14 OFDM symbols can be $\frac{1}{2}^m$ms. A "TTI" can typically refer to the duration in which the UE can receive/transmit a Transport Block (TB) from higher layers, such as Medium Access Control (MAC) Protocol Data Unit (PDU) from a MAC layer. Higher layer logical channels can be mapped on to a transport channel Data on a transport channel can be organized in to transport blocks and at least one transport block is transmitted to the UE in a TTI. Two transport blocks may be transmitted in a TTI in case of spatial multiplexing and may depend on the number of layers, such as one TB when the number of layers is less than or equal to 4, and two TBs when then number of layers is more than 4 The TTI length can depend on how TBs are mapped to REs, and OFDM symbols. The TTI can include resources for a control channel, which can be used for resource assignment within the TTI to the UE. The physical layer can offer information transfer services to MAC and higher layers transport channels such as Downlink Shared Channel (DL-SCH) and Uplink Shared Channel (UL-SCH), which can be characterized by support for HARQ, dynamic link adaptation by varying the modulation, coding and transmit power, dynamic and semi-static resource allocation, possibility to use beamforming, etc. The DL-SCH and UL-SCH transport channels of subframe length TTI can be mapped to physical channels PDSCH and PUSCH with associated control channels such as PDCCH and PUCCH.

The PDCCH can inform the UE about at least the resource allocation/assignment and HARQ information of subframe length TTI DL-SCH, and uplink scheduling grant and HARQ information for subframe length TTI UL-SCH. The PUCCH can carry HARQ ACK/NAKs in response to subframe length TTI downlink transmission and can carry Scheduling Requests (SRs) and CSI reports. Over the physical layer, the subframe length TTI DL and UL transmissions can use subframes with a plurality of OFDM/SC-FDMA symbols, such as 14 symbols at 15 kHz subcarrier spacing numerology with 1 ms subframe duration. The PDCCH channel can carry the control information about the data being transmitted on the current subframe and the information about the resources that a UE can use for the uplink data. That means it can be mandatory for the UE to decode the PDCCH successfully if the UE wants to transmit or receive data.

For reduced latency, short TTI (sTTI) can provide support for a TTI length shorter than a subframe length. The transport blocks of DL-SCH and UL-SCH transport channels can be mapped to short TTI physical channels PDSCH (sPDSCH) and PUSCH (sPUSCH) with associated control channels short PDCCH (sPDCCH) and short PUCCH (sPUCCH). For reduced latency, a shortened PDCCH (sPDCCH) can be defined to play a similar role in a sTTI or a group of sTTIs. The sPDCCH can inform the UE about at least the resource allocation/assignment and HARQ information of a sTTI DL-SCH, uplink scheduling grants, and Hybrid ARQ information related to sTTI UL-SCH. The sPUCCH can carry Hybrid ARQ ACK/NAKs in response to short TTI downlink transmission, and can carry Scheduling Request (SR), and possibly CSI reports. The sPDCCH and sPUCCH may be transmitted with duration shorter than subframe length.

Over the physical layer, the short TTI DL and UL transmissions can use slots or subslots which can be a portion of a subframe with a number of OFDM/SC-FDMA symbols, such as 7 symbols slot, 2 or 3 symbols subslot with 15 kHz subcarrier spacing numerology, smaller than the number of symbols of the subframe, such as 14 symbols. For reduced latency, a shortened PDCCH (sPDCCH) can be defined to play a similar role in a sTTI or a group of sTTIs.

For PDCCH, allocation of resources can happen in terms of CCEs that are equivalent to 36 REs. One CCE can be the minimum PDCCH allocation unit. For sPDCCH, sPDCCH can be formed by aggregation of one or more short CCEs (sCCEs), with each sCCE can include a set of resource elements, such as 48 REs or 72 REs. One sCCE can be the minimum sPDCCH allocation unit.

For example, a CCE can include 9 Resource Element Groups (REGs), and each REG can include 4 consecutive REs of an RB excluding REs belonging to Cell Specific Reference Signals (CRSs). The REGs forming a CCE can be distributed across the PDCCH control region, such as PDCCH symbols in time and system BW in frequency, through an interleaving formula. A sCCE can include less REGs than the 9 REGs of a legacy CCE. In particular, a sCCE can include 6 sREGs for DMRS-based sPDCCH in a 3-symbol sTTI and 4 sREGs otherwise, such as for CRS-based sPDCCH in 2 or 4-symbol sTTI and for DMRS-based sPDCCH in a 2-symbol sTTI. Each sREG can include 1 RB within 1 OFDM symbol including REs for CRS and/or DMRS, where the reference symbol for decoding a DMRS-based sPDCCH is a DMRS reference signal; the reference symbol for decoding a CRS-based sPDCCH is a CRS reference signal; and the sREGs are distributed in sPDCCH symbols in time and in sPDCCH RB-set in frequency according to another interleaving formula.

As the sTTI length becomes smaller, the control overhead increases, which in turn increases the complexity and hence the processing delay, which can negatively impact the latency reduction offered by low-latency operation. To reduce the control signal overhead, a few general approaches are possible. One approach can include scheduling multiple sTTIs via a single grant, such as sent via an sPDCCH or (E)PDCCH command, which can be referred to as multi-sTTI scheduling. Another approach can include sending the control information in a hierarchical manner, such as more than one step. For example, a first step can provide a subset of control information common to a set of sTTIs at a first time instant and a second step can provide complementary control information pertinent to each sTTI at a second time instant. Another approach can include sending the control information in each scheduled sTTI, but with some DCI bit field reduction compared to the DCIs used for legacy 1 ms-TTI. For instance, for 2 and/or 3-symbol sTTI, the Resource Block Group (RBG) size, which, referred to as "sRBG" for sTTI, can be larger, such as 2-6 times larger, than that of used for legacy 1 ms-TTI.

Figure 2:
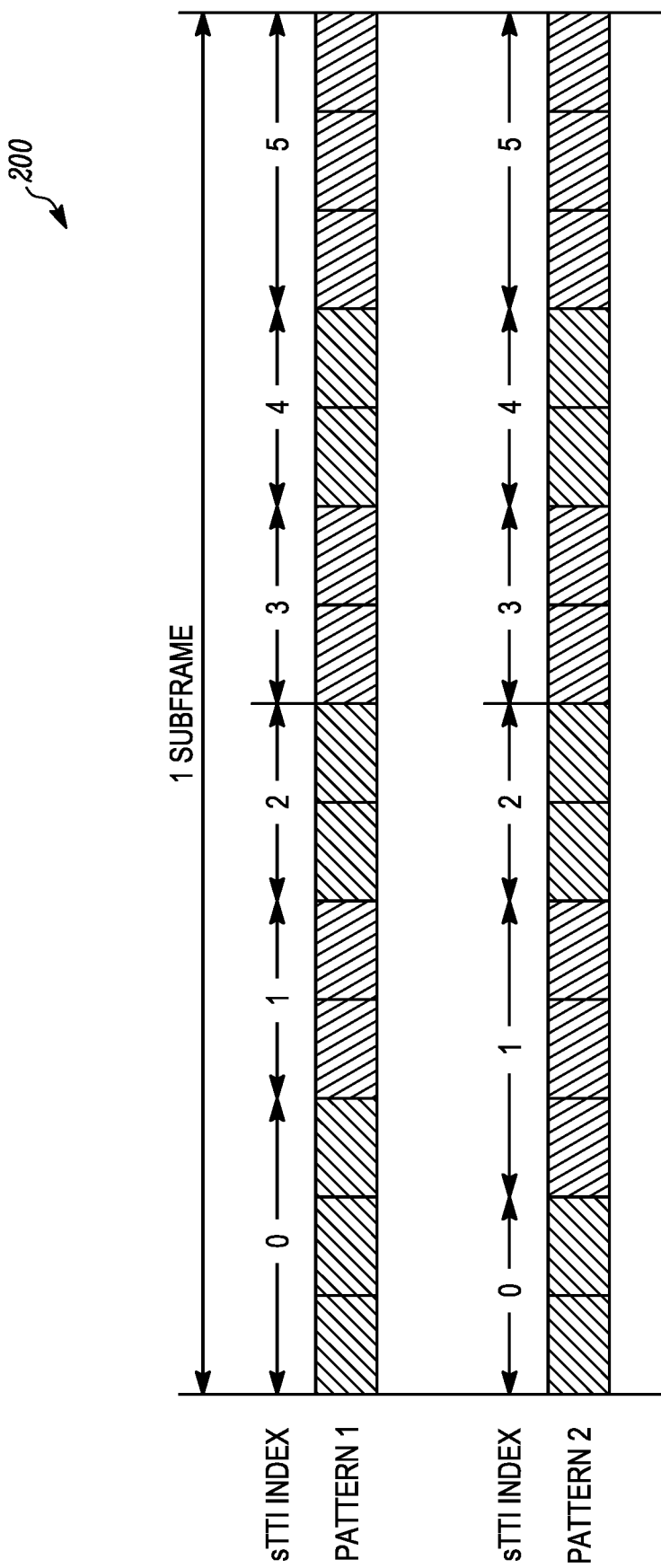
FIG. 2 is an example illustration of a DL sTTI pattern according to a possible embodiment.

FIG. 2 is an example illustration 200 of a DL sTTI pattern according to a possible embodiment. For 2-symbol DL TTI, the following sTTI patterns in OFDM symbols per subframe can be supported for 2/3 OFDM symbol-sTTI configuration. For a Component Carrier (CC) configured with a 2-symbol sTTI operation, for a cross-carrier scheduled CC, the starting symbol index of the first potential sPDSCH can be configured by Radio Resource Control (RRC); and for a self-carrier scheduled CC, the starting symbol index of the first potential sPDSCH can equal a Control Format Indicator (CFI) value indicated by PCFICH. A UE can determine the sTTI pattern as follows: If the starting symbols index of the first potential sPDSCH is 1 or 3, the 2-symbol DL sTTI pattern is one. If the starting symbols index of the first potential sPDSCH is 2, the 2-symbol DL sTTI pattern is two.

The number of required RBs for sPDCCH assuming CCE size of 36, and different sPDCCH AL and symbol length can be tabulated in Table 1. Similarly, for CCE size of 48, Table 2 can show the required number of RB.

TABLE 1

Number of RBs taken for sPDCCH for different ALs and number of sPDCCH symbols assuming 36 REs for sCCE

| # of sPDCCH symbols | CRS present in one of sPDCCH symbol(s) | CCE size in REs | AL | # RBs |
|---|---|---|---|---|
| 1 | no | 36 | 1 | 3 |
| 1 | no | 36 | 2 | 6 |
| 1 | no | 36 | 3 | 9 |
| 1 | no | 36 | 4 | 12 |
| 1 | no | 36 | 6 | 18 |
| 1 | no | 36 | 8 | 24 |
| 2 | no | 36 | 2 | 3 |
| 2 | no | 36 | 4 | 6 |
| 2 | no | 36 | 6 | 9 |
| 2 | no | 36 | 8 | 12 |

TABLE 2

Number of RBs taken for sPDCCH for different ALs and number of sPDCCH symbols assuming 48 REs for sCCE

| # of sPDCCH symbols | CRS present in one of sPDCCH symbol(s) | CCE size in REs | AL | # RBs |
|---|---|---|---|---|
| 1 | no | 48 | 1 | 4 |
| 1 | no | 48 | 2 | 8 |
| 1 | no | 48 | 3 | 12 |
| 1 | no | 48 | 4 | 16 |
| 1 | no | 48 | 6 | 24 |
| 1 | no | 48 | 8 | 32 |
| 2 | no | 48 | 2 | 4 |
| 2 | no | 48 | 4 | 8 |
| 2 | no | 48 | 6 | 12 |
| 2 | no | 48 | 8 | 16 |

Resource utilization mechanisms can take advantage of unused sPDCCH resources for sPDSCH. Some resource utilization mechanisms can rely on few bits in DL assignment corresponding to a sPDSCH to indicate some or all of the unused sPDCCH resources to be utilized in the sPDSCH allocation. In multi-sTTI scheduling, a single grant/assignment can allocate resources for sPUSCH/sPDSCH for multiple sTTIs.

Figure 3:
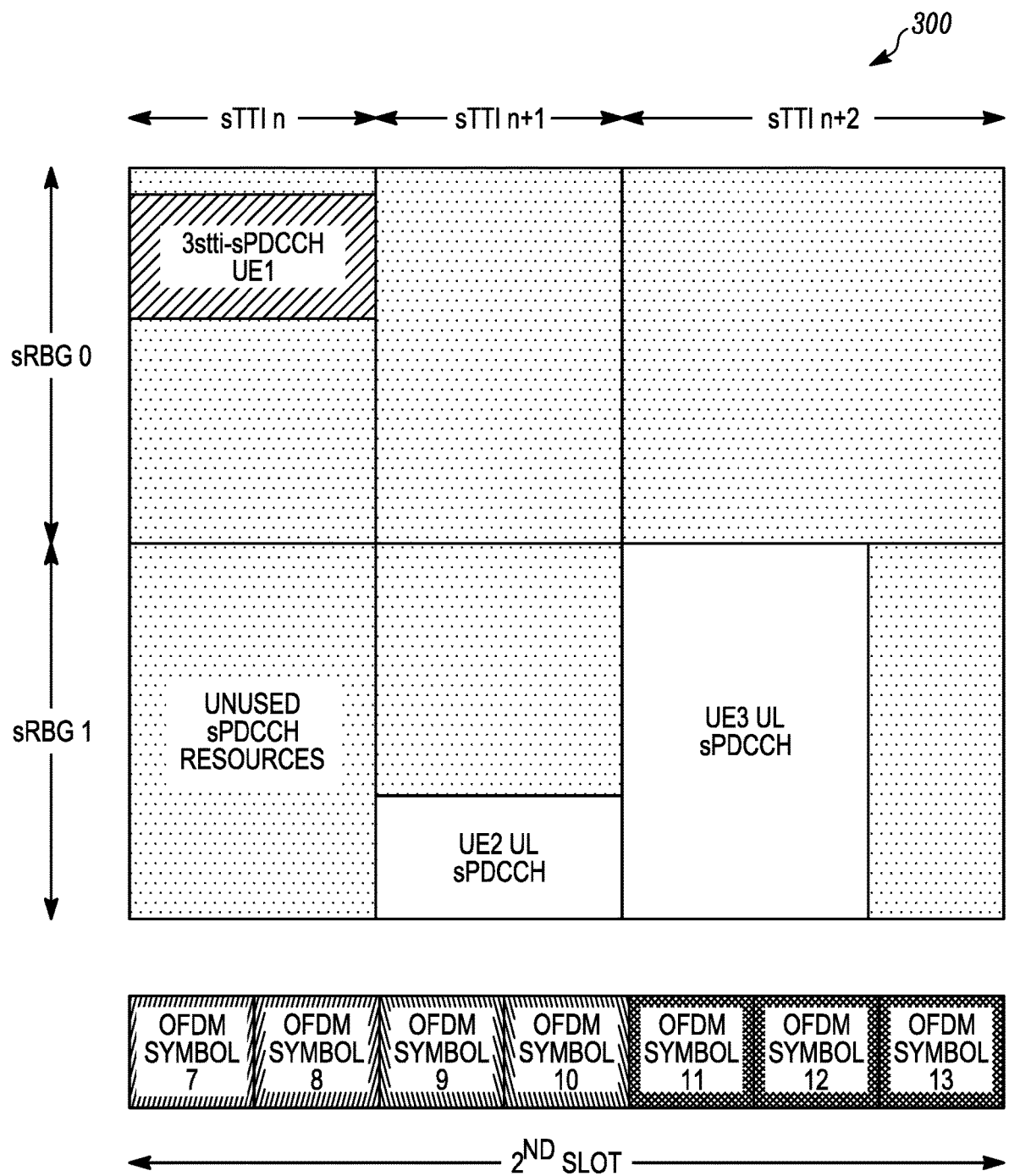
FIG. 3 is an example illustration showing where at sTTI n, UE1 is scheduled with two sRBGs for the duration of three sTTIs for sPDSCH according to a possible embodiment.

FIG. 3 is an example illustration 300 showing where at sTTI n, UE1 is scheduled with two sRBGs for the duration of three sTTIs (sTTI n, sTTI n+1, and sTTI n+2) for sPDSCH according to a possible embodiment. sRBG 1 can be potentially allocated to sPDCCHs for UEs in the cell. At sTTI n, sRBG 1 may not be occupied by sPDCCHs. However, at sTTI n+1, a portion of sRBG 1 can be used for scheduling UE 2 for UL. Similarly, the whole sRBG 1 for the duration of 2 OFDM symbols in sTTI n+2 can be given to UE 3's scheduling. At sTTI n, embodiments can provide for what an eNB signals to UE1 with respect to reuse of sRBG 1 at sTTI n, sTTI n+1, and sTTI n+2 for sPDSCH. Embodiments can provide resource utilization schemes to take advantage of unused sPDCCH resources for sPDSCH when sPDSCH resources are assigned via a multi-sTTI assignment, noting that at the time of multi-sTTI assignment, such as at sTTI n, an eNB may not have knowledge about the sPDCCH resource usage in the rest of multi-sTTI-scheduled sTTIs in sTTI n+1, and n+2 assuming an assignment for 3 sTTIs.

Figure 4:
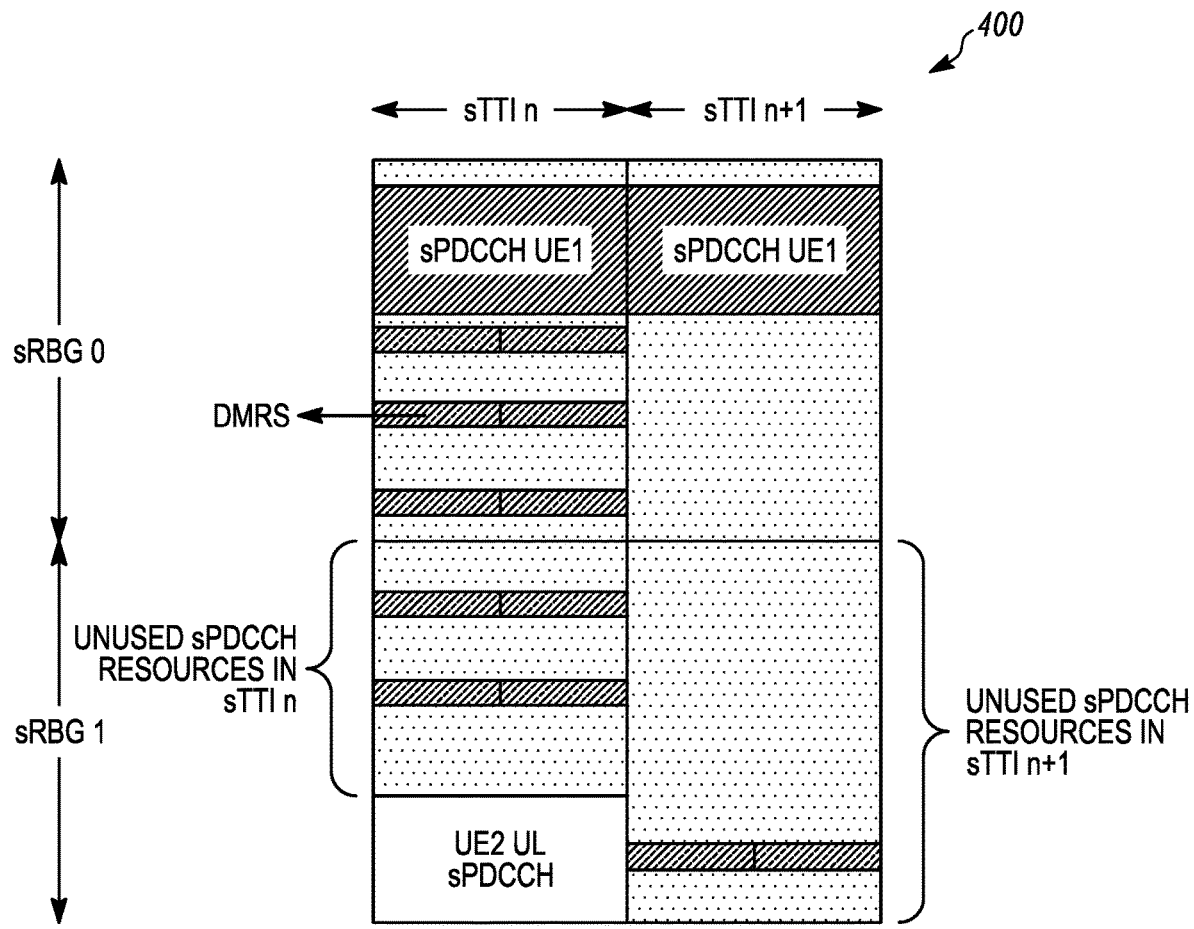
FIG. 4 is an example illustration showing where UE1 is assigned resources in sRBG0 and sRBG1 for sPDSCH according to a possible embodiment.

FIG. 4 is an example illustration 400 showing where UE1 is assigned resources in sRBG0 and sRBG1 for sPDSCH according to a possible embodiment. UE1 can rely on Demodulation Reference Signals (DMRS) sent in sTTI n for demodulating sPDSCH in sTTI n+1. Since in the resources used for a UE2 sPDCCH UL grant at sTTI n, no DMRS may be sent for UE1, and a DMRS corresponding to that area can be sent in sTTI n+1 if UE1 is instructed to do so, such as via sPDCCH sent for UE1 in sTTI n+1. Resource utilization schemes can take advantage of unused sPDCCH resources for sPDSCH when a UE is scheduled in an sTTI where it uses DMRS in another sTTI.

Figure 5:
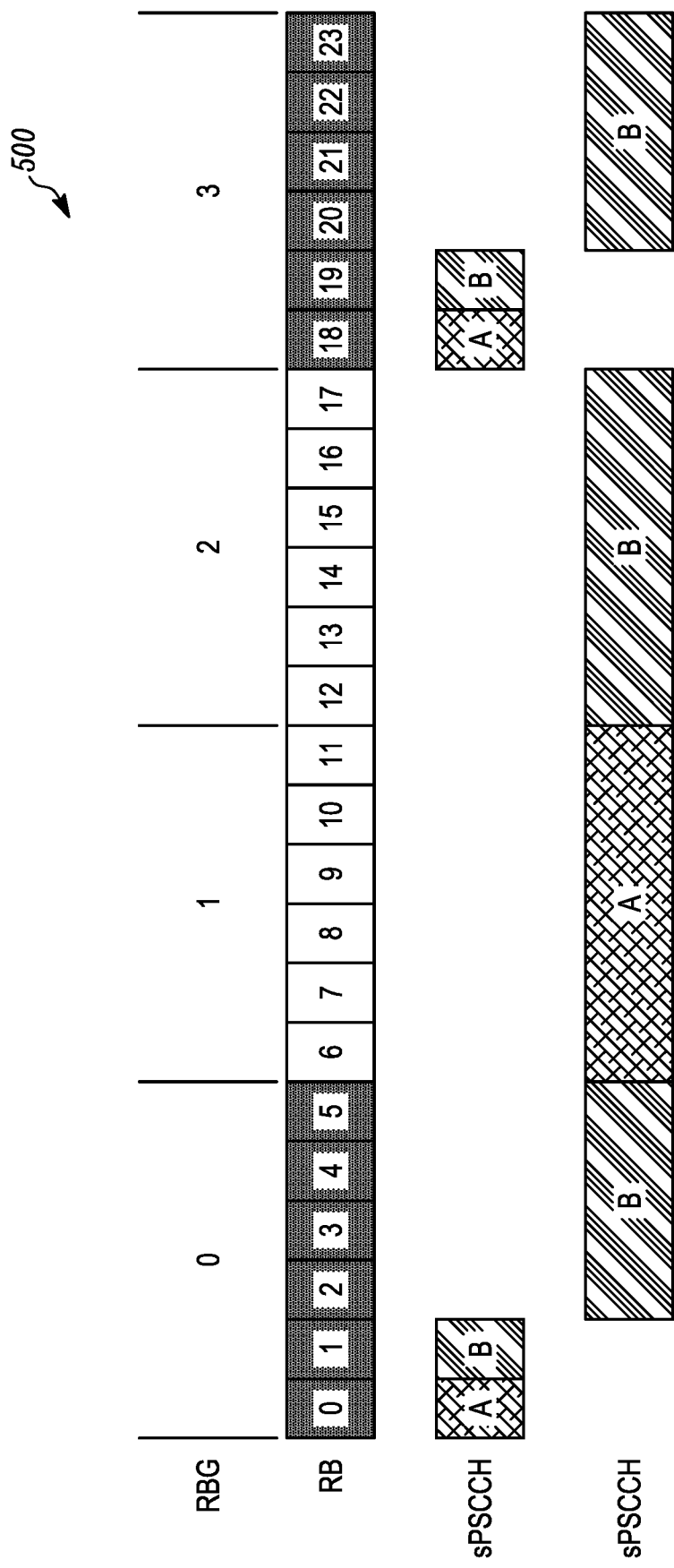
FIG. 5 is an example illustration where UE A and UE B are assigned DL resources at sTTI n according to a possible embodiment.

FIG. 5 is an example illustration 500 where UE A and UE B are assigned DL resources at sTTI n according to a possible embodiment where the horizontal axis is frequency. Embodiments can provide for reuse for sPDSCH scheduled via multi-sTTI assignment. Assume UE1 is scheduled for multiple consecutive DL sTTIs via multi-sTTI scheduling. RB 0 and RB 1 can contain control resources. UE A can be signaled RBG 1 and UE B can be signaled RBG 2, such as for sPDSCH. With one-bit in sPDCCH, UE B can be assigned the rest of the sPDCCH region for full reuse after its own DL assignment, such as assigned RBs 2-5 in RBG 0 and RBs 20-23 in RBG 3.

Figure 6:
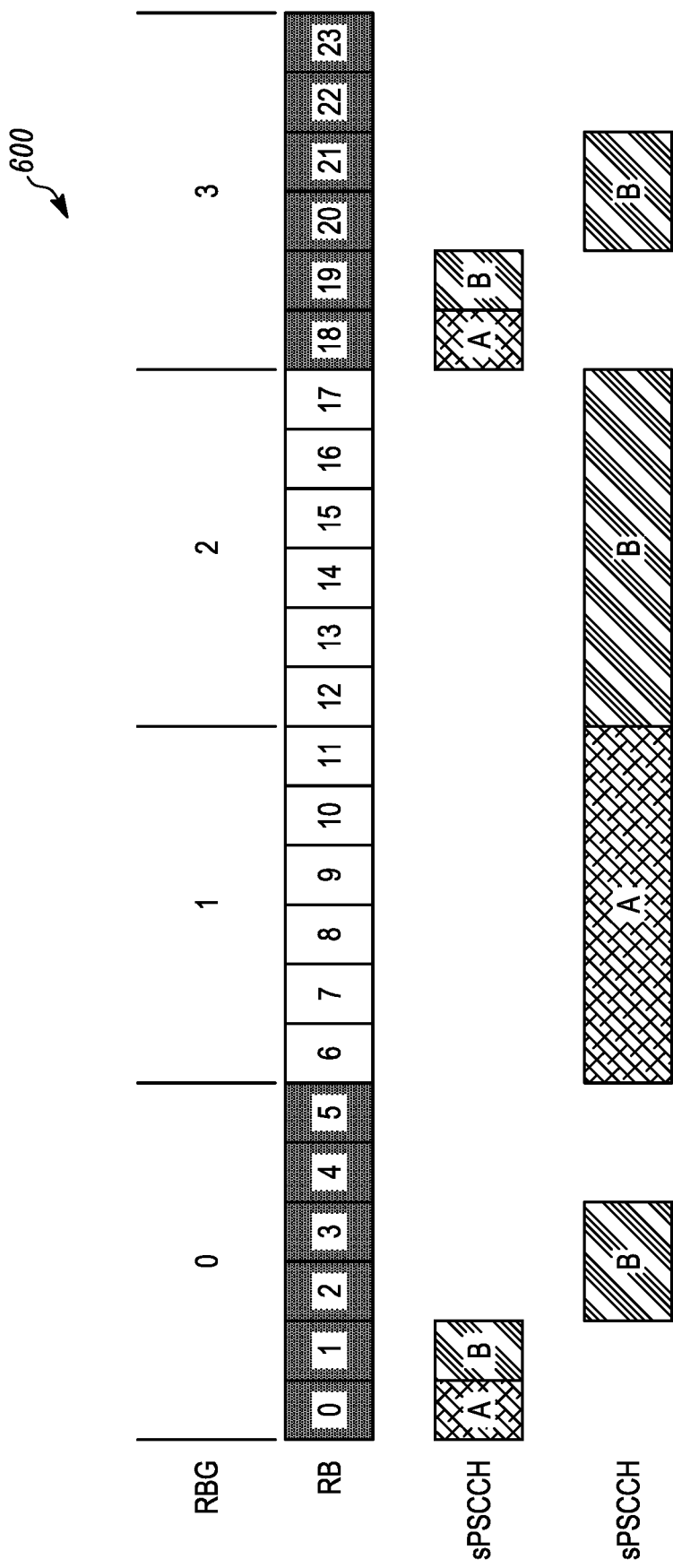
FIG. 6 is an example illustration where UE A and UE B are assigned DL resources at sTTI n according to a possible embodiment.

FIG. 6 is an example illustration 600 where UE A and UE B are assigned DL resources at sTTI n according to a possible embodiment. RB 0 and RB 1 can contain control resources. UE A can be signaled RBG 1 and UE B can be signaled RBG 2. With one-bit in sPDCCH, UE B can be assigned a fraction of sPDCCH region for partial reuse after its own DL assignment, such as assigned RBs 2 and 3 in RBG 0 and RBs 20 and 21 in RBG 3.

According to a possible embodiment, the reuse can be applicable to all scheduled sTTIs via the multi-sTTI grant. This can be justified since generally multi-sTTI scheduling can be used for high priority data and leaving potentially unused sPDCCH resources in future sTTIs can impact the high priority data that is scheduled via the multi-sTTI grant. If needed, by scheduling, for example, a DL assignment or an UL grant for another UE, an eNB can use the sPDCCH resources given to UE1 for sPDSCH in some of the sTTIs to avoid sPDCCH blocking, which can hurt the sPDSCH decoding performance, since UE1's assumption is the reused resources have been allocated to it.

For example, in the illustration 300, an eNB at sTTI n+1, and sTTI n+2 can take back some of the resources in sRBG 1 originally given to UE1's sPDSCH in sTTI n, for sending control information to UE2, and UE3 at sTTI n+1, and sTTI n+2, respectively. Another sPDSCH decoding issue can be in the case of DMRS sharing across sTTIs, for example, assuming sTTI n until sTTI n+3 are scheduled for UE1 via multi-sTTI scheduling. If sTTI n+3's sPDSCH decoding depends on the DMRS that was supposed to be sent in sTTI n+2, and a portion of the resources corresponding to that DMRS were overwritten for sPDCCH of one or more other UEs, then sPDSCH decoding performance in sTTI n+3 can be degraded.

According to another possible embodiment, reuse can be applicable to a fraction of unused resources. According to a possible implementation, the first scheduled sTTI can use the full amount of indicated/determined unused sPDCCH resources, whereas the rest of the sTTIs can assume a fraction of the full amount determined for the first scheduled sTTI. According to another possible implementation, the illustration 500 shows a full unused sPDCCH resource utilization for sPDSCH for UE B, such as RBs 2-5 in RBG 0 and RBG 3. The illustration 600 shows the same allocation with partial reuse where only the first two RBs, such as RBs 2-3 in RBG 0 and RBs 20 and 21 in RBG 3, after the UE B grant is given to sPDSCH for UE B. The number of RBs can be indicated via higher layer or physical layer or can be determined by the UE based on one or more of parameters like number of scheduled sTTIs in the multi-sTTI assignment, the size of the sPDCCH region, and/or other parameters. According to a possible implementation, the first scheduled sTTI can use the full amount of indicated/determined unused sPDCCH resources, such as where at sTTI n, UE B follows the sPDSCH assignment shown in the illustration 500, whereas the rest of sTTIs can assume a fraction of the full amount determined for the first scheduled sTTI, such as where, at sTTI n+1, UE B can follow sPDSCH assignment shown in the illustration 600. According to another possible implementation, all scheduled sTTIs can assume a fraction of sPDCCH resources, such as at in sTTI n and sTTI n+1, etc. where UE B can follow sPDSCH assignment shown in the illustration 600. This can serve as a trade-off between full usage of unused resources vs. avoiding sPDCCH blocking in future scheduled sTTIs and can avoid puncturing large amount of sPDSCH in the future scheduled sTTIs.

Figure 7:
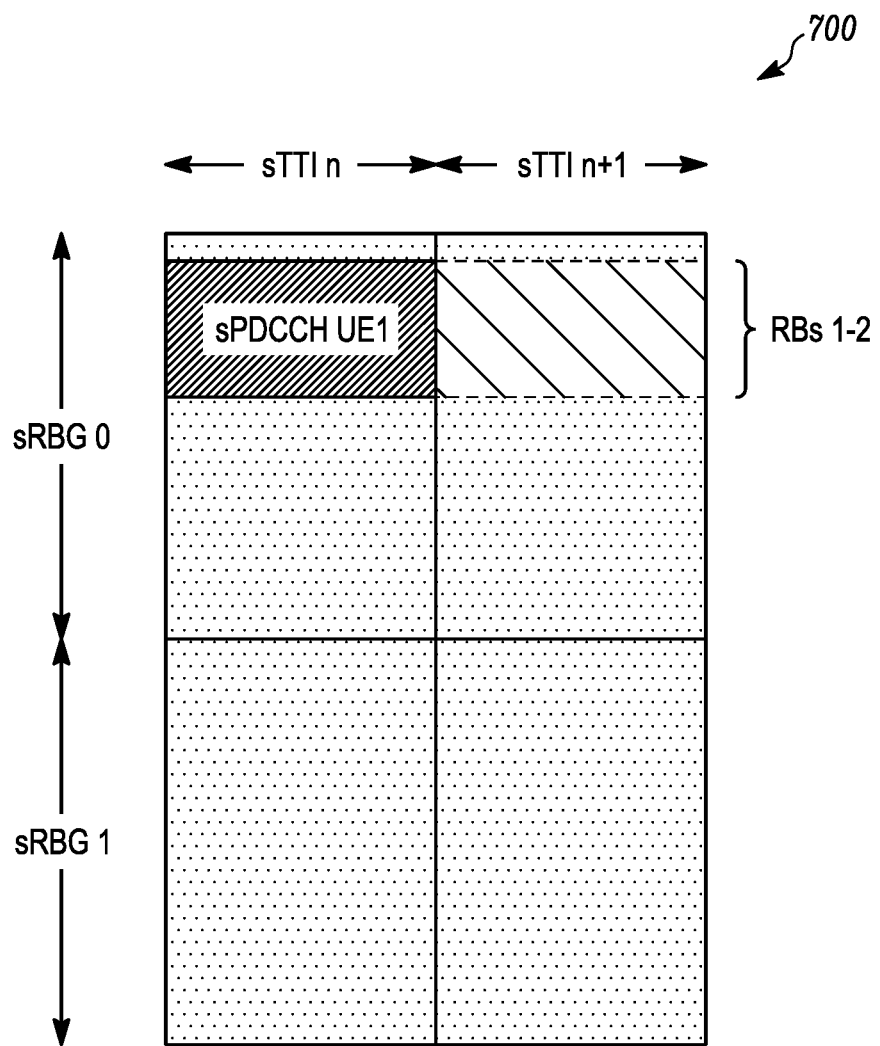
FIG. 7 is an example illustration of using resources used for multi-sTTI assignment for sPDSCH in other sTTIs according to a possible embodiment.

FIG. 7 is an example illustration 700 of using resources used for multi-sTTI assignment for sPDSCH in other sTTIs according to a possible embodiment. At sTTI n, UE1 can receive a 2-sTTI DL assignment allocating sPDSCH resources in sTTI n and sTTI n+1. At sTTI n+1, UE1 can know that in sTTI n+1 the frequency resources used in sTTI n, such as RB 1-2, are filled with sPDSCH for the UE. The place of multi-sTTI assignment or resources corresponding to a mapping, such as a hashing function with respect to a sTTI index, of resources used for multi-sTTI assignment can be used for sPDSCH in other sTTIs.

Figure 8:
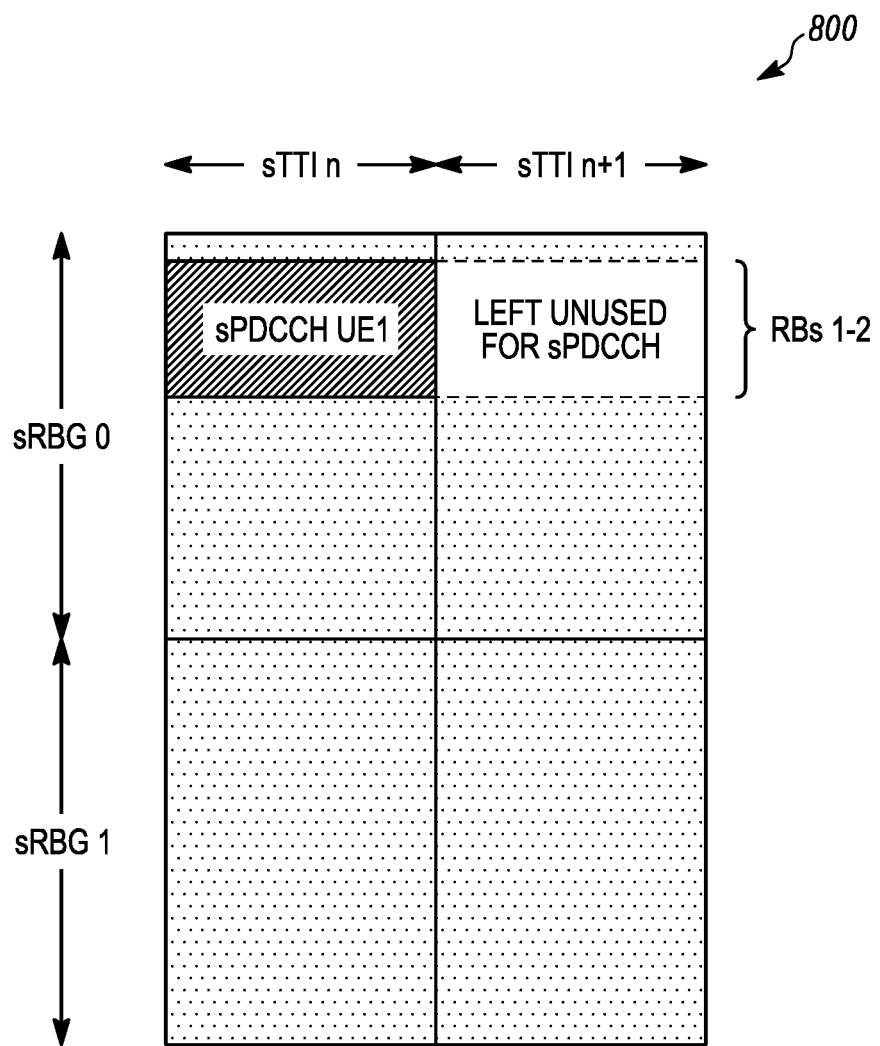
FIG. 8 is an example illustration showing the place of a UE's own grant can be used for other potential sPDCCH in other sTTIs according to a possible embodiment.

FIG. 8 is an example illustration 800 showing the place of a UE's own grant can be used for other potential sPDCCH in other sTTIs according to a possible embodiment. For example, at sTTI n, UE1 can receive a 2-sTTI DL assignment allocating sPDSCH resources in sTTI n and sTTI n+1. At sTTI n+1, UE1 can know that in sTTI n+1, the frequency resources used in sTTI n, such as RB 1 and 2, should be left unused for the UE's sPDSCH allocation.

According to another possible embodiment, reuse may be only applicable to all scheduled sTTIs if the amount/fraction of reused resources with respect to the allocated DL resources is below a certain amount/threshold. This can avoid a large sPDCCH blocking possibility. According to another possible embodiment reuse may not be possible if a UE is scheduled with multi-TTI DL assignment.

According to another possible embodiment, reuse may only be only applicable to the first sTTI in a subframe. According to a possible implementation, reuse may only be applicable to first m scheduled sTTIs. The value of m can be fixed in the specifications. The value of m can also be derived based on multi-sTTI assignment, such as based on the number, w, of scheduled sTTIs. For example, if w=2, then m=2 and if w≥3 then m=3. The value of m can also be signaled via high layers such as RRC or Medium Access Control Control Element (MAC CE). The value of m can also be indicated in the multi-sTTI assignment. Various combinations of the above embodiments can also be employed.

In the above and following embodiments, the control resources, such as for sPDCCH, can change from one sTTI to another sTTI, such as based on a mapping. In such cases, the UE can determine resources for reuse accordingly. According to a possible implementation, the UE can reuse the control resources overlapping with the sPDSCH allocation if reuse is enabled. According to another possible implementation, the reuse can also be applicable to control resources that do not overlap with the sPDSCH allocation in an sTTI, such as sTTI n+x, if the control resources in the sTTI, where the multi-sTTI assignment was sent, are mapped to the new control resources in the sTTI n+x.

According to another possible embodiment, if a subframe is used for multi-sTTI scheduling, control resources can remain the same for all sTTIs. According to another possible embodiment, the control candidates can be mapped to different resources from one sTTI to another sTTI. However, the set of resources used for control signaling can remain the same from one sTTI to another sTTI. According to another possible embodiment, the control candidates can be mapped to different resources from one sTTI to another sTTI and the set of resources that can be used for control signaling can change from one sTTI to another sTTI.

According to another possible embodiment, a control signal in each of the scheduled sTTIs of multi-sTTI scheduling can indicate whether the user can reuse the control resources or not in that sTTI. Alternatively, the control signal can be called CR-M, can be sent in a subset of scheduled sTTIs such as every other schedule sTTIs, and can be valid for the scheduled sTTIs until the next sTTI where such a control, CR-M, can be expected again. If the UE does not receive the control message in an expected sTTI, the UE can assume a default behavior, such as where reuse is enabled or reuse is disabled, or the default behavior can be configured for the UE, such as via higher layer signaling like RRC or MAC CE. The control signal can be a group control signal, such as common to multiple UEs, where the control signal can indicate which UE can reuse the potentially reusable control resources.

Embodiments can provide for multi-sTTI assignment sent in PDCCH region. If multi-sTTI assignment is scheduled via PDCCH or only via PDCCH, there may be no reuse in sTTI0 or the reuse may be different for sTTI0. Thus, the reuse for future sTTIs, if any, can be indicated in the PDCCH assignment, and can be applicable to one or more of the following scheduled sTTIs. Alternatively, if a UE is assigned sPDSCH resources for multiple sTTIs and the assignment is sent in PDCCH, there can be no reuse of any potential unused sPDCCH resources. Then, the UE can assume sPDSCH is sent in all assigned RBs. Alternately, the UE can assume sPDSCH is punctured, such as not transmitted, in resources that can be used for sending sPDCCH.

Embodiments can provide for reuse for sPDSCH scheduled via SPS assignment. Semi-Persistent Scheduling (SPS) operation can be done on sTTI level for sTTI-related data. In such a case, the sPDSCH allocation assigned by an SPS assignment can be periodically or almost periodically repeated with certain SPS periodicity. From resource utilization of unused SPDCCH resources for sPDSCH perspective, the assignment can be periodic, and in the future the eNB may not know which of the sPDCCH resources will be taken, which can be similar to reuse for multi-sTTI scheduling. One way for addressing this can be that DCI for short TTI (sDCI) that corresponds to SPS operation may not have a field indicating any resource reuse for sPDSCH or may have a fixed value in that field, which can be used for SPS assignment verification by the UE. Another way is to have the reuse indication applicable only to the first m instances, such as m=1, for sPDSCH operation, where m can be fixed in the specifications, higher layer signaled, or physical layer signaled. Similar approaches to that of proposed for multi-sTTI scheduling may be applicable to the SPS allocation case.

Embodiments can provide for reuse for sPDSCH scheduled via cross-carrier scheduling. In case of multiple Component Carriers (CCs), and in the case of cross-carrier scheduling, reuse can be indicated for the associated sPDSCH. There can be several ways to indicate the unused sPDCCH resources in the cross-carrier scheduled component carrier. One way can be to indicate that, for example, the last or the first percent, x %, of the sPDCCH region in the associated component carrier can be occupied. The value of x can belong to a set that can be signaled by a higher layer, by a physical layer, by or a combination of both the higher layer and the physical layer. Alternately, instead of a percent, the indication can be an index pointing to a portion of the sPDCCH region, the allocated sPDSCH, the system, or the sTTI-related bandwidth in the corresponding component carrier. Another way can be to indicate whether the full sPDCCH region or set(s) is/are available or not for reuse. In yet another way there can be one or multiple mapping from the sPDCCH assigning the resources, such as cross-carrier scheduling, to a hypothetical sPDCCH location in the component carrier that sPDSCH is scheduled in. Then, one bit in the sPDCCH can indicate whether the rest of the control region in the CC that sPDSCH is allocated is allocated to the sPDSCH.

For association of CCs for the case of cross-carrier scheduling, for 1 ms operation, for the purpose of cross-carrier scheduling, there can be a mapping of which CCs can schedule which CCs with the restriction that a CC can only be scheduled by a single CC. Considering some of the CCs may not be configured for sTTI operation, then the new association can be used for sTTI operation. Another way can be to just prune the connection tree that is already set for 1 ms operation, such as if a CC is not configured for sTTI operation, it will not be cross-carrier scheduled for sTTI operation. The sDCI format in the sPDCCH search space, such as in CC1, corresponding to a cross-carrier scheduled component carrier, such as CC2, can include the carrier indicator field. If CC2 is not configured for sTTI operation, only the (E)PDCCH search space corresponding to CC2 may have DCI formats including carrier indicator field, but not the search spaces in the sTTIs after sTTI 0.

Embodiments can provide for reuse for sPDSCH scheduled with DMRS sharing across sTTIs. Resource reuse in DMRS sharing without multi-TTI scheduling, such as sTTI n and sTTI n+1, can be applicable to the DMRS sharing with multi-sTTI scheduling as well. According to a possible embodiment, when reuse is enabled for sTTI n and reuse is disabled sTTI n+1 or different that the reuse for sTTI n, for sTTI n+1, the UE can use the DMRS present in resources not given by the reuse. According to another possible embodiment if reuse is disabled for sTTI n or different than that of used in sTTI n+1, and reuse is enabled for sTTI n+1, for demodulating sPDSCH in sTTI n+1, the UE can use only DMRS in sTTI n present in resources where reuse was disabled.

Figure 9:
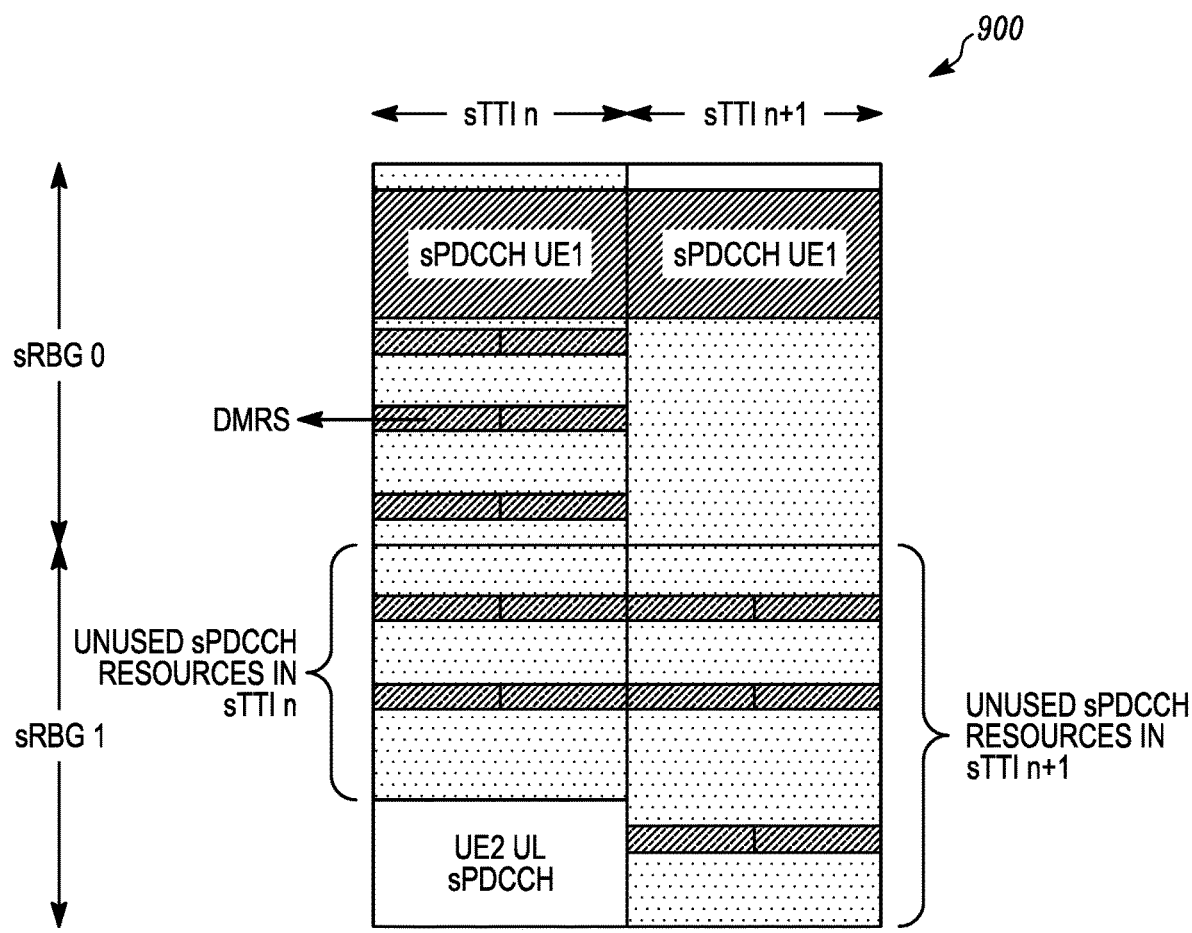
FIG. 9 is an example illustration of DMRS sharing across sTTI n and sTTI n+1 when sPDCCH resource reuse is enabled for the UE according to a possible embodiment.

FIG. 9 is an example illustration 900 of DMRS sharing across sTTI n and sTTI n+1 when sPDCCH resource reuse is enabled for the UE according to a possible embodiment. sRBG 1 can contain sPDCCH resources that can be used for sPDSCH if not used for control. At sTTI n+1, although the UE relies on the DMRS at sTTI n, in the control region, the UE can send DMRS again. According to this embodiment, where reuse is disabled for sTTI n or different than that of used in sTTI n+1, and reuse is enabled for sTTI n+1, for sTTI n+1, DMRS can be sent in the enabled resources in sTTI n+1. There can be a field in sPDCCH assignment indicating if DMRS should be sent in the reused part in the illustration 900. This can also be higher layer configured, such as via RRC. The higher layer can indicate when, in sPDCCH, the resource utilization of unused sPDCCH resources is enabled/signaled and DMRS sharing is enabled, such as in the sPDCCH, and whether DMRS in the utilized unused sPDCCH resources should be sent or not. An indication can also be used to have DMRS only in a fraction of the reused resources that were not reused in the sTTI where DMRS is shared, such as shown in the illustration 300. According to another possible implementation, the eNB may not be expected to schedule a UE with DMRS sharing and sPDCCH resource reuse.

For the case of multi-sTTI scheduling, since a single sPDCCH assignment can allocate sPDSCH resources for multiple sTTIs, in a case where reuse is indicated in the assignment and applicable to all or some of the scheduled sTTIs, and where a subset of the scheduled sTTIs contain DMRS corresponding to a fraction or entire allocated frequency resources, an eNB can do one or a combination of different approaches. According to one possible approach, the eNB can send DMRS in all or a fraction of the reused resources in all or a subset of the scheduled sTTIs. According to another possible approach, if a UE is configured, such as by higher layer signaling like RRC, to receive DMRS in the reused part, the eNB can send the DMRS.

Embodiments can provide for Transport Block Size (TBS) determination for SPDSCH assigned with sPDCCH reuse. For TBS scaling in terms of reuse, if reuse is enabled in an assignment, single-sTTI or multi-sTTI, the UE for each scheduled sTTI can determine the TBS for that sTTI based on whether and how much sPDCCH reuse is enabled for the sPDSCH in that sTTI. In a case of multi-sTTI scheduling, the reuse determination can further include determining if the location or a mapping from that location in which the multi-sTTI assignment to the UE has been sent in the scheduled sTTIs excluding the one containing the assignment, is included in the sPDSCH for each scheduled sTTI excluding the one containing the multi-sTTI assignment.

Figure 10:
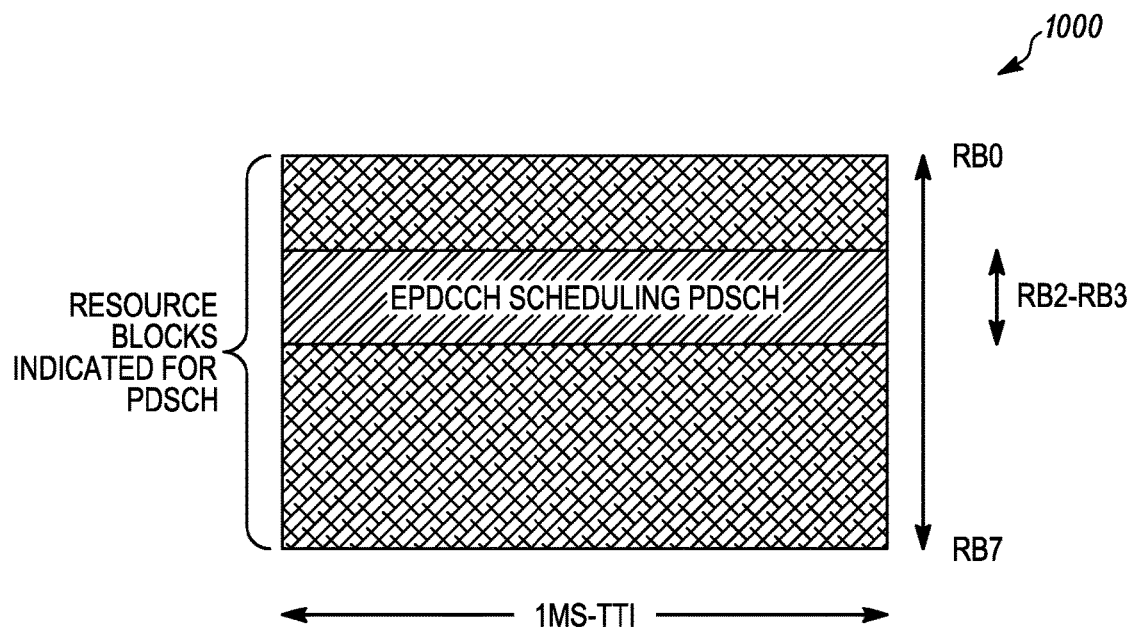
FIG. 10 is an example illustration 1000 of PDSCH not being mapped to any physical resource-block pair(s) carrying an EPDCCH associated with the PDSCH according to a possible embodiment.

FIG. 10 is an example illustration 1000 of PDSCH not being mapped to any physical resource-block pair(s) carrying an EPDCCH associated with the PDSCH according to a possible embodiment. Embodiments can provide for physical layer processing for data scheduled via multi-sTTI scheduling. In LTE, the output of the channel turbo encoder for data can be processed by a Rate-Matching (RM) module. The basic function of the RM module can be to match the number of bits in a Transport Block (TB) to the number of bits that can be transmitted in the given resource allocation, such as indicated in the DL assignment. In other words, a RM algorithm can repeat or puncture the bits of a mother codeword, such as rate 1/3 turbo coded data, to generate a requested number of bits according to a desired code rate that may be different from the mother code rate of the turbo coder.

As shown in the illustration 1000, in LTE systems for the case of scheduling via EPDCCH, PDSCH is not mapped to any physical resource-block pair(s) carrying an EPDCCH associated with the PDSCH. This basically means that if an eNB schedules a UE via EPDCCH, the eNB may not use any resources sent for EPDCCH transmission for PDSCH transmission. Even though resources indicated by EPDCCH may include the resources used by EPDCCH itself upon detection of the EPDCCH, the UE can know that the RBs containing the EPDCCH have not been used for PDSCH. For example, the EPDCCH may indicate RB0-RB8 are used for PDSCH but upon detection of the EPDCCH, the UE can know that RB2 and RB3 are not used for PDSCH, as they have been used for EPDCCH transmission.

Figure 11:
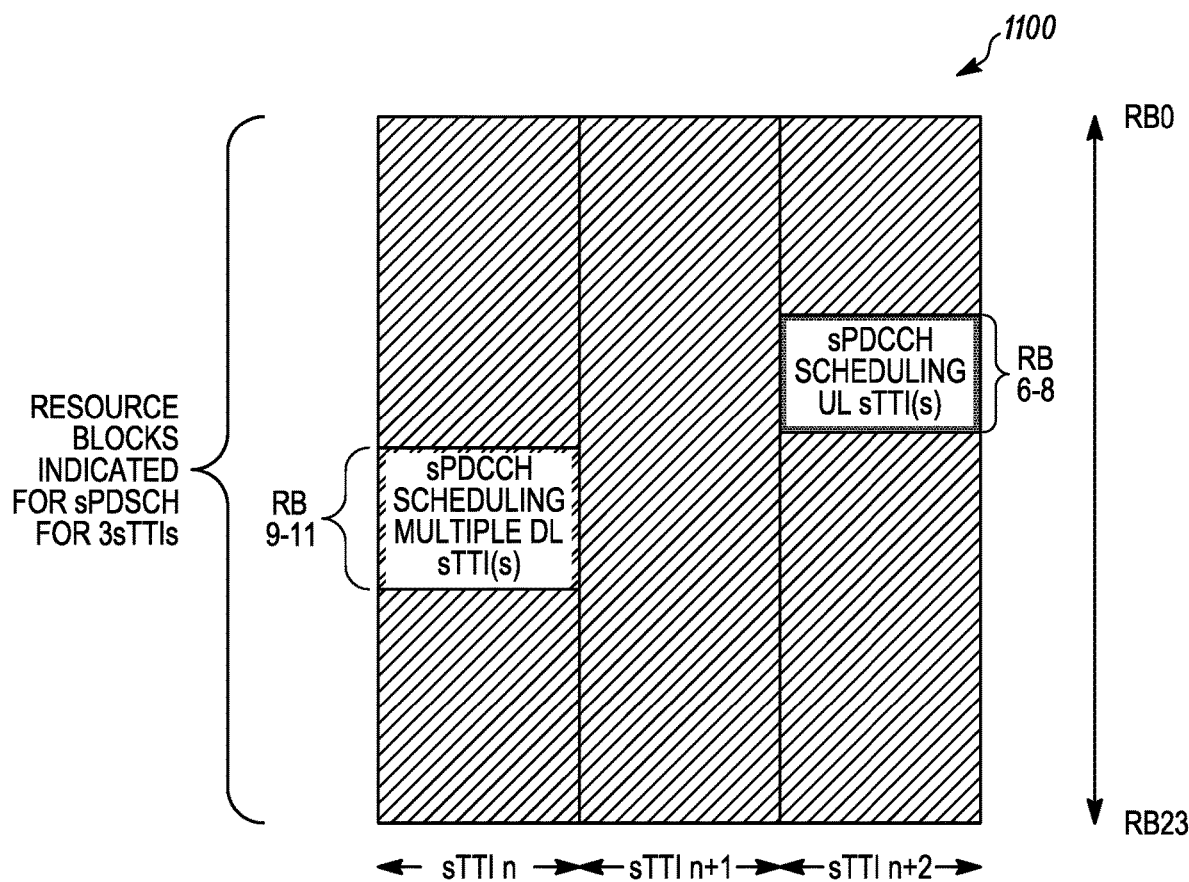
FIG. 11 is an example illustration of multi-sTTI scheduling according to a possible embodiment.

FIG. 11 is an example illustration 1100 of multi-sTTI scheduling according to a possible embodiment. In sTTI n, a UE can be scheduled, via sPDCCH, with three consecutive sTTIs via multi-sTTI assignment. In sTTI n+2, the UE can be provided with an UL grant, via sPDCCH. In sTTI n, the sPDSCH can be rate matched around sPDCCH, such as RBs 9-11, whereas in sTTI n+2, the third sPDSCH transmission can be punctured in the sPDCCH resources, such as in RBs 6-8. The sPDCCH resources in RB 6-8 can be included in the sPDSCH resource set for rate matching sPDSCH.

For example, in the case of multi-sTTI scheduling, a UE can be scheduled for multiple DL sTTIs. In the first scheduled sTTI, the eNB can send, such as rate match, the sPDSCH in the allocated resources for sPDSCH in that sTTI excluding the resources, such as REs, RBs, or RBGs, where multi-sTTI assignment was sent. In next scheduled sTTIs, such as sTTIs of the scheduled multi-sTTIs other than the sTTI in which DL multi-sTTI assignment is received, the UE can still monitor for DL assignments/UL grants or only monitor UL grants. If eNB sends a control message, such as sPDCCH2, to the UE in any of those next sTTIs, the eNB can puncture sPDSCH in the resources used for the sPDCCH2 control message transmission instead of rate matching sPDSCH around those resources. For example, the resources used for the sPDCCH2 control message transmission can be included in the set of sPDSCH resources for sPDSCH rate matching purposes rather than excluding these resources from the set of sPDSCH resources and performing sPDSCH rate matching on this excluded set. The UE can receive an indication of puncturing. The indication of puncturing can be an uplink resource allocation assignment such as sPDCCH2 control message. Using puncturing instead of rate matching can be useful for the case that the UE misses the sPDCCH2 control message. Therefore, the UE can assume the eNB sent sPDSCH data in those resources and can decode the sPDSCH accordingly. If the UE has successfully decoded the sPDCCH2 control message, the UE can set a Log-Likelihood Ratio (LLR) to zero, such as equal probability of bit being 0 or 1, of bits corresponding to sPDSCH resources overlapping with the resources used for the sPDCCH2 control message transmission. Puncturing may lead to less decoding performance degradation compared to the case where the eNB rate matched sPDSCH around those resources.

In another embodiment, the eNB can puncture sPDSCH in a subset of scheduled sTTIs and can rate match sPDSCH around sPDCCH in the rest of scheduled sTTIs. According to a possible embodiment, if a UE is scheduled for multiple DL sTTIs via a multi-sTTI grant, the UE may not monitor control candidates, such as sPDCCH, for DL assignment associated with the sTTI length that the UE has been scheduled for multi-sTTI scheduling.

According to another possible embodiment, if a eNB schedules a UE for DL transmissions on multiple sTTIs via a single assignment, eNB, in the first scheduled sTTI, the eNB may not map sPDSCH to any physical resource-block carrying an sPDCCH associated with the sPDSCH. In any other scheduled sTTI, such as except the first scheduled sTTI, the eNB can puncture sPDSCH in any physical resource-block carrying an sPDCCH for the UE in that sTTI. For example, the eNB can remove some of the bits, such as parity bits, after turbo encoding of the sPDSCH that would have been mapped into any physical resource-block carrying an sPDCCH for the UE in that sTTI. Other embodiments can use other notions of resource instead of RB, such as RE, RBG, sRB like RB defined for sTTI, or sRBG like RBG defined for sTTI.

According to another possible embodiment, the same puncturing idea can be applicable to a single scheduled sTTI. For example, if an eNB sends a DL assignment and an UL grant to a UE in an sTTI, if the resources allocated to sPDSCH contain some or all of resources where the UL grant is sent to the UE, the eNB can puncture sPDSCH in those resources.

To reduce the number of Blind Decode (BD) attempts for sTTI operation, the same payload size can be used for DL and UL sDCI. The sDCI may include a field for resource utilization as discussed above or the sDCI may not contain such a field. Embodiments can more efficiently implement the BD reduction/distribution scheme.

According to a possible embodiment, the sDCI size can be the same for UL and DL sDCIs for low ALs, but not for high ALs. For example, if the payload size for UL sDCI of a UE is small enough as compared to that of the DL sDCI, a smaller AL for the UL sDCI can yield a similar decoding performance with respect to the DL sDCI using a larger AL. In addition, since, the number of control candidates with high ALs can be smaller compared to those of lower ALs, time-frequency resources can be saved if different UL and DL sDCI sizes are used for the UE at the expense of a few additional BD attempts.

Whether to have UL and DL sDCIs have the same size can be RRC configured for each AL, for a subset of ALs, or for all ALs. An AL threshold can be defined, and UL/DL sDCI length can be the same for the ALs below the threshold AL and can be different for ALs above the threshold AL. The threshold AL can be signaled via higher layer signaling such as RRC or MAC CE, can be signaled via physical layer signaling such as slow-DCI at the beginning of a subframe, and/or can be specified in specifications.

In case of multiple CCs, a subset of CCs can be allowed to have UL and DL candidates with the same size for a particular AL, and some of them may not be given DL and UL candidates with the same size for that AL. For example, the primary CC for a particular AL can have UL and DL candidates with the same size, whereas the secondary CCs for that AL may not have UL and DL candidates with the same size. Alternatively, all CCs configured for sTTI operation for a UE can be configured to have the same UL sDCI and DL sDCI length. As another alternate, all CCs configured for sTTI operation for a UE may not support the same UL and DL sDCI length.

Considering DL sTTI patterns shown in the illustration 200, some sTTIs can have length 2 and some can have length 3. The set of possible ALs and the number of candidates associated with each AL can depend on the sTTI length within the subframe. For example, sTTI 5 in DL sTTI pattern 1 and sTTIs 1 and 5 in DL sTTI pattern 2 shown in the illustration 200 can have length of 3 OFDM symbols and can be able to accommodate more candidates with high ALs. In that sense, having the same payload size for UL and DL sDCI for all ALs can be used in those sTTIs. This can achieve BD reduction at the cost of wasting some resources, but since those sTTIs contain 3 symbols, some wastage of resources for control purpose can be tolerable.

In an embodiment having 2/3 OFDM symbol-sTTI length for DL sTTI operation and 7-OFDM symbol-sTTI length for UL sTTI operation, sPDCCHs in different DL sTTI can schedule UL transmissions in the same UL sTTI. In such embodiment, the number of UL sPDCCH candidates to be monitored in each 2/3 OFDM symbol sTTI can be determined based on the {DL, UL} sTTI length or based on the timing mapping of DL to UL sTTI. This embodiment can be used if the processing timing for acknowledgment is different than that of data, such as where more processing time is needed for DL data processing, ACK generation, and transmission than for UL grant processing and UL data generation and transmission. For example, UL grant candidates can be distributed into two sTTIs that can result from timing perspective the same sTTI is used for UL data transmission. To elaborate, if x UL grant candidates was originally supposed to be monitored in each sTTI, now in each sTTI only a portion, such as x/2 of the UL candidates, can be monitored. Alternatively, in some sTTIs, no UL grant candidate may be monitored. The distribution of UL grant candidates can be uniform, such as similar ALs, in all sTTIs with UL grant candidates, or non-uniform with some ALs in some sTTIs that can carry UL grants, and different ALs in other sTTIs that can carry UL grants.

Figure 12:
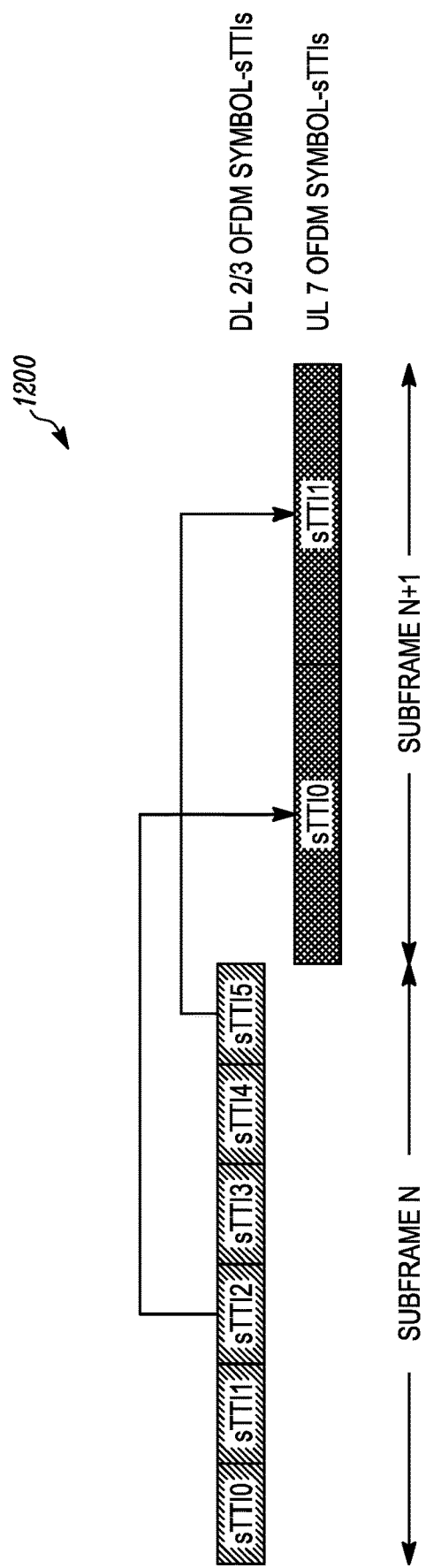
FIG. 12 is an example illustration of using 2/3 OS DL and 7 OS UL configuration according to a possible embodiment.

FIG. 12 is an example illustration 1200 of using 2/3 Orthogonal Symbol (OS) DL and 7 OS UL configuration according to a possible embodiment. In sTTIs 0, 1, 3, and 4, the UE may not monitor any UL grant candidate. In sTTIs 2 and 5, the UE can monitor UL grant candidates. Thus, the UE can monitor UL grant candidates in certain DL sTTIs. The indices of sTTIs to monitor UL grant candidates can be fixed in the specifications or can be configured by higher layer signaling. The indices of sTTIs to monitor UL grant candidates can also be determined based on the subframe number, a UE index, and/or other information. The indices of sTTIs to monitor UL grant candidates can additionally be determined as that corresponding to the set of sTTIs, such as the latest sTTIs, that can provide the smallest processing time compared to sTTI not included in the set of sTTIs and that can meet the minimum required processing time from UL grant to UL data transmission. For example, assuming 3 sTTI duration for minimum required processing time, and for UL data transmission beginning in sTTI n, UL grant candidates can be present in a set of sTTIs {n−5, n−4, n−3}.

The sPDCCH can span over one symbol if the eNB so configures the UE. In another embodiment, DL sTTI length can be in general short enough as compared to that of the UL sTTI length. Thus, if a UE is configured with 2/3 OFDM symbol for DL and 7-OS for UL, the sPDCCH can be sent using 2 symbols. This may be because the early decoding benefit of sPDCCH may not be possible in the situation where UL sTTI length is large enough as compared to the DL sTTI length.

For a UE configured with sTTI operation in UL, for the last sTTI, which contains 3 SC-FDMA symbols, of an UL subframe, if the UE determines one of the following UL-Shared Channel (UL-SCH) Data (D) and DMRS (R) combinations: "DDD", "DDR", "RDD", "DRD" in a subframe where SRS is supposed to be transmitted by the UE, the UE can drop the SRS in the last symbol and can send "D" or "R" based on the determined combination. In another embodiment, the UE can drop the SRS in the above scenario if it is configured to do so by higher layer signaling, such as via such as RRC or MAC CE. In another embodiment, the UE can drop the SRS if the UE determines the last SC-FDMA symbol is either D or R. In another embodiment, the UE can determine the D and R combination based on an indication in an UL grant that has been sent in a previous DL sTTI.

Figure 13:
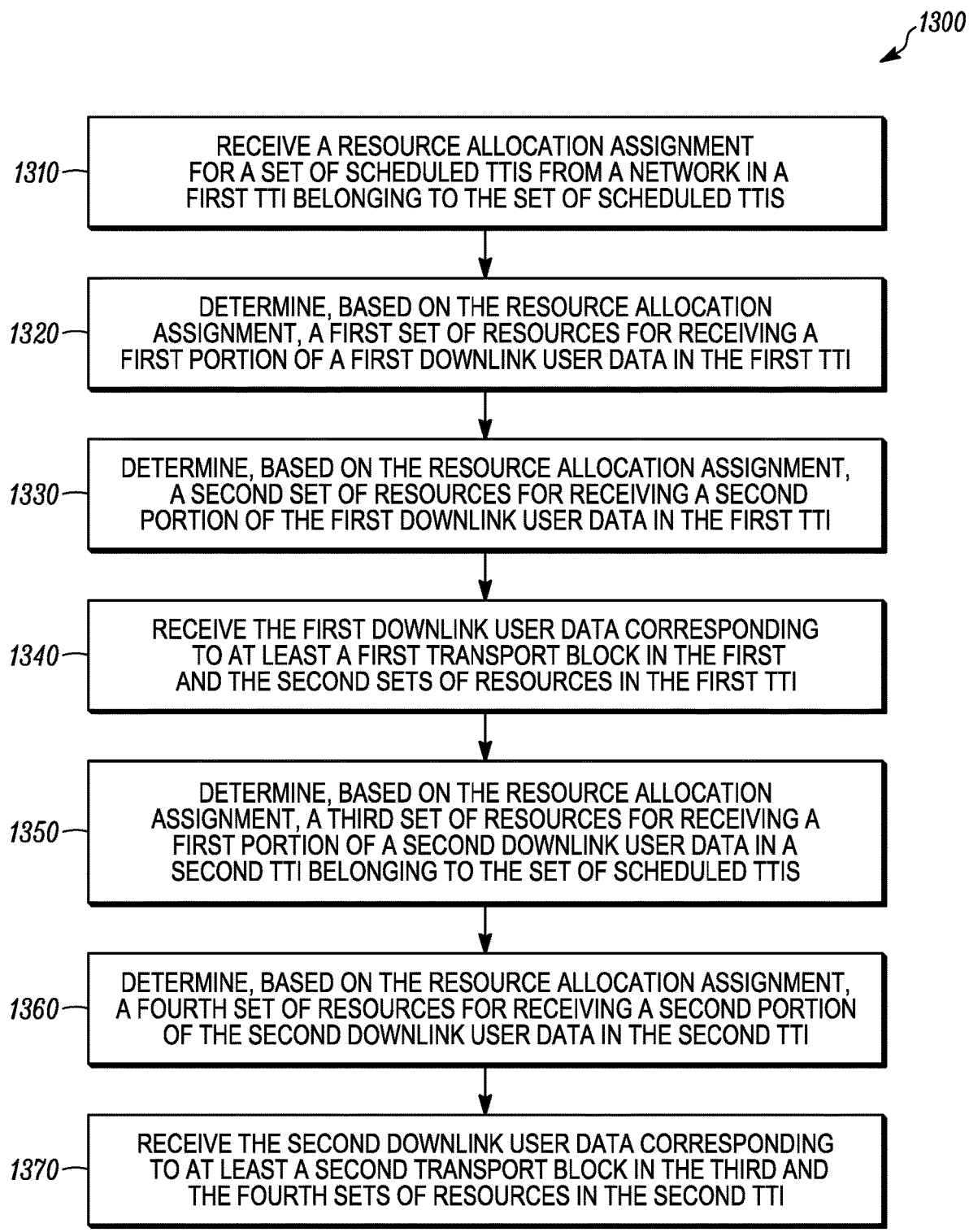
FIG. 13 is an example flowchart illustrating the operation of a wireless communication device according to a possible embodiment.

FIG. 13 is an example flowchart 1300 illustrating the operation of a wireless communication device, such as a UE, according to a possible embodiment. Reciprocal operations can be performed by a network entity on a network side. At 1310, a resource allocation assignment for a set of scheduled TTIs can be received from a network in a first TTI belonging to the set of scheduled TTIs. The resource allocation assignment can be received in a physical control channel.

At 1320, a first set of resources for receiving a first portion of a first downlink user data in the first TTI can be determined based on the resource allocation assignment. Determinations based on assignments can be based on the assignment content and/or based on a time/frequency location of where each assignment was sent. The first set of resources can be ordinary data resources for sPDSCH, such as resources that are specifically allocated to a user data channel.

User data is different from downlink control information received on control channels. For example, control information received on control channels is used for configuring and operating wireless communication, whereas user data is sent on wireless communication that was configured using control information. As a further example, user data can be received on a physical data channel and control information can be received on a physical control channel User data received on physical data channel, such as PDSCH, can include higher layer logical traffic channels and can also include higher layer control information such as handover messages sent on a higher layer logical control channel such as a dedicated control channel Such logical channels can be mapped on to a data transport channel, such as a Downlink Shared Channel (DL-SCH), which then can be mapped onto the physical data channel, such as PDSCH. Data on a transport channel can be organized in to transport blocks and at least one transport block can be transmitted to the UE in a TTI. Two transport blocks can be transmitted in a TTI in case of spatial multiplexing and can depend on the number of layers, such as when then number of layers is more than four. Downlink control information, such as scheduling and resource allocation assignment information, can be sent on a physical control channel, such as (s)PDCCH.

At 1330, a second set of resources for receiving a second portion of the first downlink user data in the first TTI can be determined based on the resource allocation assignment. The first set and the second set of resources may not overlap. For example, the first and the second set of resources may not overlap at a resource element level. The second set of resources can belong to a resource set configured for downlink control information. The UE may not be expected to receive the second portion of the first downlink user data if the set of scheduled TTIs contains more than one TTI. The second set of resources can be resources configured for a control region that are reused for sPDSCH. For example, the second set of resources can belong to a time-frequency resource set that can be used to convey control information, such as DL assignments and/or UL grants, to the UE or another UE. A field in the received resource allocation assignment can indicate the second set of resources.

According to a possible implementation, the resource allocation assignment can be a Semi-Persistent Scheduling (SPS) assignment PDCCH. The field in the resource allocation assignment can be used as one of the conditions for validation of the SPS assignment PDCCH. The condition for validation of the SPS assignment PDCCH can include receiving the PDCCH with a field value of the field set to a pre-determined sequence of bits. The validation can be achieved, such as only achieved, if the filed in the received PDCCH has the same bit-field as a known sequence of bits. There can be other validation rules and all of them may have to be checked. If each of them not validated then there may be no validation.

At 1340, the first downlink user data corresponding to at least a first transport block in the first and the second sets of resources in the first TTI can be received. The first downlink user data can correspond to a first redundancy version of a channel coded of the at least the first transport block.

At 1350, a third set of resources for receiving a first portion of a second downlink user data in a second TTI belonging to the set of scheduled TTIs can be determined based on the resource allocation assignment. The terms "first" downlink user data and the "second" downlink user data are used to distinguish the downlink data in different TTIs and not necessarily to distinguish different users receiving the data or different downlinks transporting the data. Thus, the first downlink user data and the second downlink user data can be received by one user in at least one downlink in the first and second TTIs, and the downlink user data may also be received by other users and/or on other downlinks. The third set of resources in the second TTI can be the same as the first set of resources in the first TTI. The third set of resources in the second TTI can use the same resource blocks as the first set of resources in the first TTI. The second downlink user data corresponding to the at least the second transport block can be received in the third set of resources in the second TTI.

The second TTI can be subsequent to the first TTI. For example, the second TTI can occur immediately after the first TTI or later. The first TTI can be of a first TTI duration and the second TTI can be of a second TTI duration. The first TTI duration can be different from the second TTI duration. The first TTI can be a first portion of a first subframe and the second TTI can be a second portion of a second subframe. The second TTI can be subsequent to the first TTI and the first portion can be different than the second portion. The first subframe can be the same as or different from the second subframe.

At 1360, a fourth set of resources for receiving a second portion of the second downlink user data in the second TTI can be determined based on the resource allocation assignment. The fourth set of resources can be a subset of the second set of resources in the first TTI. The fourth set of resources in the second TTI can use a subset of resource blocks used for the second set of resources in the first TTI. The fourth set of resources can be the same as or less than the second set of resources. The fourth set of resources can also be an empty set. The fourth set of resources can be the same in all TTIs except the first TTI in the set of scheduled TTIs. The fourth set of resources can be resources in a sPDCCH region reused for sPDSCH, whereas the third set of resources can be ordinary resources for sPDSCH. The fourth set of resources can be an empty set. The fourth set of resources can be determined from a mapping applied to the second set of resources, and wherein the mapping is a function of a TTI index within a plurality of TTIs. The plurality of TTIs can be a subframe, and the TTIs can be shortened TTIs.

At 1370, the second downlink user data corresponding to at least a second transport block in the third and the fourth sets of resources in the second TTI can be received. The first transport block and the second transport block may be the same. The second downlink user data can correspond to a second redundancy version of the channel coded of the at least the second transport block. The second redundancy version can be the same as or different from the first redundancy version.

According to a possible implementation, the first set of resources in the first TTI can include a first set of RBs in the first TTI. The second set of resources in the first TTI can include a second set of RBs in the first TTI. The resource set configured for downlink control information in the first TTI can include at least the second set of RBs. The third set of resources in the second TTI can include a third set of RBs in the second TTI. A frequency location and a number of RBs of the third set of RBs in the second TTI can be the same as a frequency location and a number of RBs of the first set of RBs in the first TTI. The fourth set of resources in the second TTI can include a fourth set of RBs in the second TTI. A number of RBs of the fourth set of RBs in the second TTI can be less than or equal to a number of RBs of the second set of RBs in the first TTI. A frequency location of each RB in the fourth set of RBs in the second TTI can be the same as a frequency location of one of RBs of the second set of RBs in the first TTI.

Higher layer signaling can be received. The higher layer can be higher than the physical layer. The higher layer signaling can indicate a maximum number of resource blocks associated with the fourth set of resources. The number of RBs of the fourth set of RBs in the second TTI can be determined by the resource allocation assignment if the number of RBs of the fourth set is less than or equal to the maximum number of resource blocks associated with the fourth set. Otherwise, the number of RBs of the fourth set can be equal to the maximum number of resource blocks associated with the fourth set. For example, the number of RBs in the fourth set of resources can be capped by higher layer signaling.

The transport block size of the first transport block in the first TTI can be the same as the transport block size of the at second transport block size in the second TTI. The transport block size can be determined at least based on the second set of RBs and fourth set of RBs.

According to a possible implementation, the resource allocation assignment can be received in at least a portion of the second set of resources in the first TTI. The first downlink user data can be received in the first and the second set of resources in the first TTI. The first downlink user data can be rate-matched around the at least the portion of the second set of resources corresponding to the received resource allocation assignment. The second downlink user data can be received in the third and the fourth set of resources in the second TTI. The second downlink user data can be rate-matched around a portion of the fourth set of resources. The portion of the fourth set of resources can include at least a portion of the at least the portion of the second set of resources. For example, a set of frequency resources "X" in which the resource allocation assignment is received in the first TTI can be determined. The first downlink user data can be rate-matched around the set of frequency resources "X" in the first TTI. The second downlink user data can be rate-matched around the set of frequency resources "X" in the second TTI.

According to another possible implementation, the resource allocation assignment can be received in at least a portion of the second set of resources in the first TTI. The first downlink user data can be received in the first and the second set of resources in the first TTI. The first downlink user data can be rate-matched around the at least the portion of the second set of resources corresponding to the received resource allocation assignment. An indication of puncturing a portion of the fourth set of resources in the second TTI can be received. Receiving the indication of puncturing can include receiving an uplink resource allocation assignment in at least the portion of the fourth set of resources in the second TTI. The second downlink user data can be received in the third and the fourth set of resources in the second TTI. The second downlink user data can be punctured in the resources corresponding to the portion of the fourth set of resources. For example, the second TTI can be punctured. Receiving the second downlink user data in the third and the fourth set of resources in the second TTI can include receiving the second downlink user data in the third and the fourth set of resources in the second TTI assuming equi-probable second downlink user data coded bit values associated with the resources corresponding to the portion of the fourth set of resources. The equi-probable second coded bit values, such as equal probability of bit being 0 or 1, can set the likelihood ratio, such as the ratio of probability that bit is 0 to the probability that bit is 1, to 1 or the LLR to zero for the bit.

According to a possible implementation, uplink resource allocation assignment candidates can be monitored in a search space in the first TTI while not monitoring downlink resource allocation assignment candidates in the second TTI. For example, if a UE is scheduled for multiple DL TTIs via a multi-TTI grant, the UE may not monitor control, such as sPDCCH, candidates for DL assignment associated with the TTI length that the UE has been scheduled for multi-TTI scheduling.

According to a possible embodiment, a first set of ALs and a second set of ALs can be determined, and scheduling assignments in an TTI can be monitored, based on the first and second sets of ALs, a set of DCI format sizes associated with downlink transmissions, and a set of DCI format sizes associated with uplink transmissions. Monitoring can include monitoring at least one scheduling assignment candidate in a search space at a first AL of the first set of ALs in the TTI, according to a first DCI format size. The first DCI format size can be an element of both the set of DCI format sizes associated with downlink transmissions and the set of DCI format sizes associated with uplink transmissions. Monitoring can also include monitoring at least one scheduling assignment candidate in a search space at a second AL of the second set of ALs in the TTI according to a second DCI format size. The second DCI format size can be an element of only one of the set of DCI format sizes associated with uplink transmissions and the set of DCI format sizes associated with uplink transmissions. For example, for any DCI associated with uplink transmissions with a first AL that the UE monitors in the TTI, there can exist at least a DCI associated with downlink transmissions with the first AL that the UE monitors in the TTI with the same payload size, where the first AL can belong to the first set of ALs. For an DCI associated with uplink transmissions with a second AL that the UE monitors in the TTI, there may not exist any associated with uplink transmissions DCI associated with uplink transmissions with the second AL that the UE monitors in the TTI with the same payload size where the second AL belongs to the second set of ALs. A minimum AL in the second set of ALs can be larger than a maximum AL in the first set of ALs.

Figure 14:
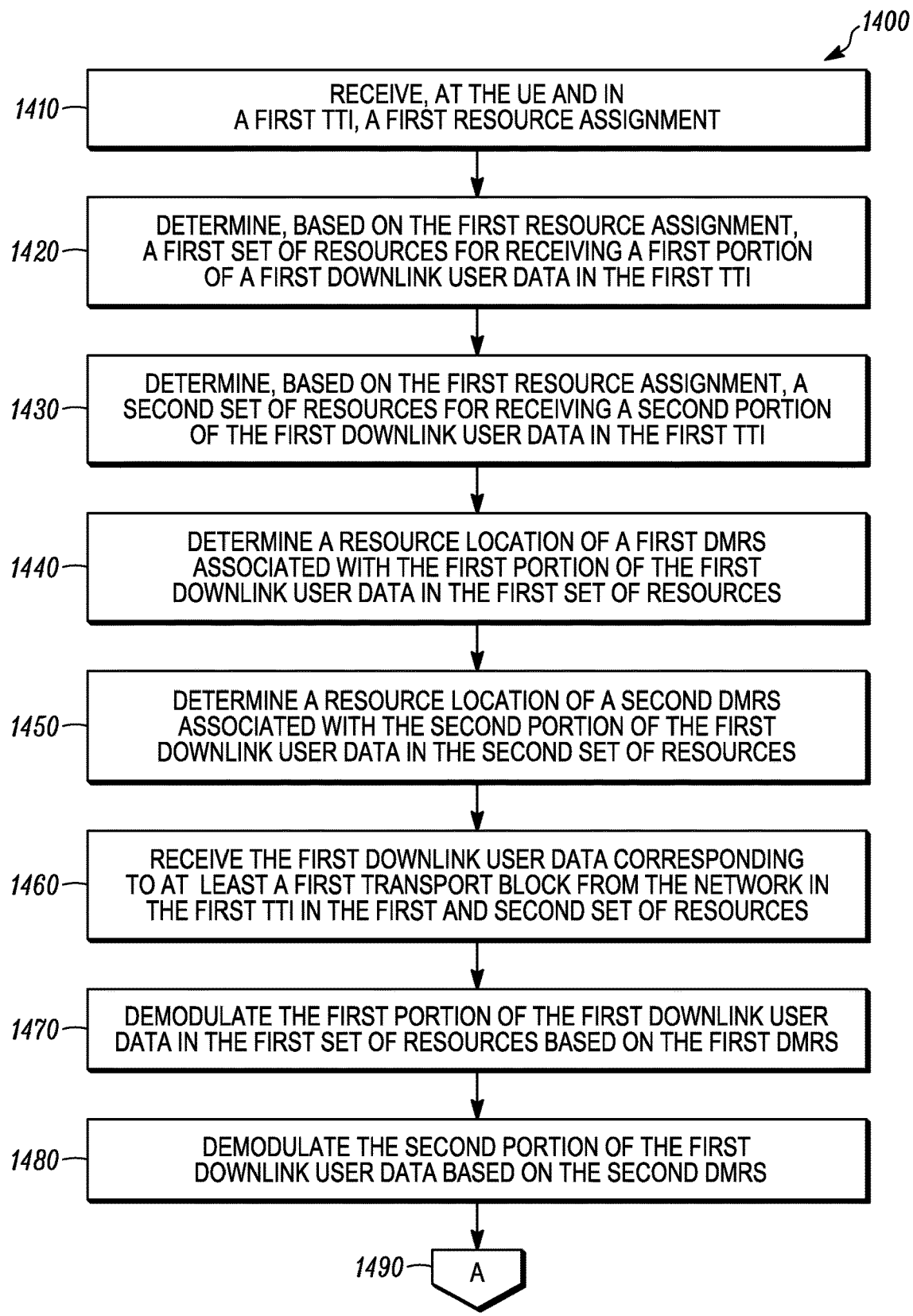
FIGS. 14 and 15 are example flowcharts illustrating the operation of a wireless communication device according to a possible embodiment.
Figure 15:
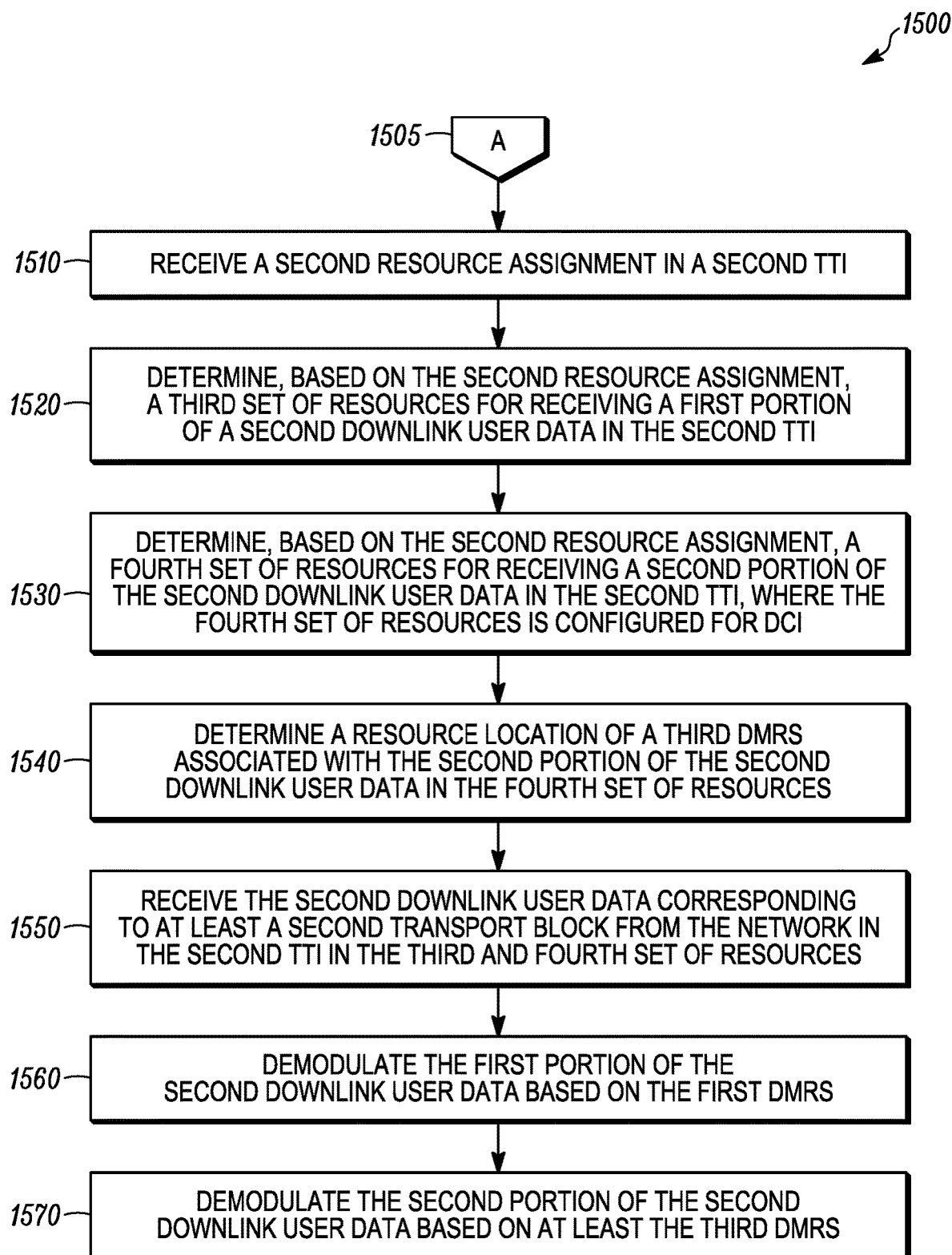

FIGS. 14 and 15 are example flowcharts 1400 and 1500 illustrating the operation of a wireless communication device, such as a UE, according to a possible embodiment. A network entity can perform reciprocal operations on a network side.

At 1410, a first resource assignment can be received in a first TTI. At 1420, a first set of resources for receiving a first portion of a first downlink user data in the first TTI can be determined based on the first resource assignment. At 1430, a second set of resources for receiving a second portion of the first downlink user data in the first TTI can be determined based on the first resource assignment. The second set of resources can be configured for DCI. The second set of resources may not overlap with the first set of resources. At 1440, a resource location of a first DMRS associated with the first portion of the first downlink user data in the first set of resources can be determined. At 1450, a resource location of a second DMRS associated with the second portion of the first downlink user data in the second set of resources can be determined.

At 1460, the first downlink user data corresponding to at least a first transport block can be received from the network in the first TTI in the first and second set of resources. At 1470, the first portion of the first downlink user data in the first set of resources can be demodulated based on the first DMRS. At 1480, the second portion of the first downlink user data can be demodulated based on the second DMRS. At 1490, the flowchart 1400 can proceed to 1505 of the flowchart 1500.

At 1510, a second resource assignment can be received in a second TTI. At 1520, a third set of resources for receiving a first portion of a second downlink user data in the second TTI can be determined based on the second resource assignment. The first and third set of resources can be configured for user DL data. At 1530, a fourth set of resources for receiving a second portion of the second downlink user data in the second TTI can be determined based on the second resource assignment. The fourth set of resources can be configured for DCI. The fourth set of resources may not overlap with the third set of resources. The second set of resources and the fourth set of resources can be configured by RRC or the resource assignment for including user DL data in a control region.

At 1540, a resource location of a third DMRS associated with the second portion of the second downlink user data in the fourth set of resources can be determined. An indication that indicates whether or not the third DMRS is present in the fourth set of resources can be received. Determining the resource location of the third DMRS can be performed if the indication indicates the third DMRS is present in the fourth set of resources.

At 1550, the second downlink user data corresponding to at least a second transport block can be received from the network in the second TTI in the third and fourth set of resources. At 1560, the first portion of the second downlink user data can be demodulated based on the first DMRS. At 1570, the second portion of the second downlink user data can be demodulated based on at least the third DMRS.

The first set of resources in the first TTI can include a first set of RBs in the first TTI. The second set of resources in the first TTI can include a second set of RBs in the first TTI. The resource set configured for DCI in the first TTI can include at least the second set of RBs. The third set of resources in the second TTI can include a third set of RBs in the second TTI. The fourth set of resources in the second TTI can include a fourth set of RBs in the second TTI.

According to a possible implementation, the second portion of the second downlink user data in the fourth set of resources can be demodulated. The second portion of the second downlink user data can be demodulated based on the second and third DMRS. For example, the user DL data in the fourth set of resources can be received in a PDSCH of the fourth set of resources, such as in a control region originally for PDCCH that can be reused for PDSCH. A RRC message and/or a DL grant can indicate reuse. The second portion of the second downlink user data in the fourth set of resources can be demodulated based on the second DMRS in a first subset of RBs of the fourth set of resources and based on the third DMRS in a second subset of RBs of the fourth set of resources. A third resource assignment can be received in at least a portion of the second set of resources in the first TTI. The third resource assignment can assign resources for uplink transmission in another TTI. The second subset of RBs in the second TTI can at least include the frequency location of the at least the portion of the second set of resources. For example, if the user finds an UL grant in the first TTI, it can expect to receive third DMRS in the second TTI in those resources.

According to a possible implementation, the first resource assignment can be received in at least a portion of the second set of resources in the first TTI. The second resource assignment can be received in at least a portion of the fourth set of resources in the second TTI. The first downlink user data in the first and the second set of resources can be received in the first TTI. The first downlink user data can be rate-matched around the at least the portion of the second set of resources corresponding to the received first resource allocation assignment. The second downlink user data can be received in the third and the fourth set of resources in the second TTI. The second downlink user data is rate-matched around the at least the portion of the fourth set of resources corresponding to the received second resource assignment. For example, this can be a case where the PDCCH may have occupied different number of RBs, such as in different ALs, in the first and second TTIs and reuse can be by RRC. The at least the portion of the fourth set of resources can be a subset of the at least the portion of the second set of resources. A higher layer indication can be received from the network and the second and the fourth set of resources can be determined based on the higher layer indication.

According to a possible implementation, the second set of resources can be determined based on a field in the first resource assignment. The field can indicate whether a configured set of resources for DCI is used for receiving the first downlink user data in the first TTI. The fourth set of resources can be determined based on a field in the second resource assignment. The field can indicate whether the configured set of resources for downlink control information is used for receiving the second downlink user data in the second TTI.

According to a possible implementation, a first set of ALs and a second set of ALs can be determined. Scheduling assignments in the first TTI and second TTI can be monitored based on the first and second sets of ALs, a set of downlink DCI format sizes, and a set of uplink DCI format sizes. Monitoring can include monitoring at least one scheduling assignment candidate in a search space at a first AL of the first set of ALs in the first TTI and second TTI according to a first DCI format size. The first DCI format size can be an element of both the set of DCI format sizes associated with downlink transmissions and the set of DCI format sizes associated with uplink transmissions. Monitoring can also include monitoring at least one scheduling assignment candidate in a search space at a second AL of the second set of ALs in the first TTI and second TTI according to a second DCI format size. The second DCI format size can be an element of only one of the set of DCI format sizes associated with downlink transmissions and the set of DCI format sizes associated with uplink transmissions. The first resource assignment can be received in one of the scheduling assignment candidates in the first TTI. The second resource assignment can be received in one of the scheduling assignment candidates in the second TTI.

According to a possible embodiment, a first control message using a first DCI format can be received. The first control message can include a set of control channel elements aggregated using a first aggregation level. The first DCI format can be for assignments corresponding to a first TTI duration. The first control message can be associated with a DCI format corresponding to a DL assignment. The first control message in a third TTI can be decoded using a first DCI size. The first control message can include the first resource assignment. A second control message using a second DCI format can be received. The second control message can include a set of control channel elements aggregated using the first aggregation level. The second DCI format can be for assignments corresponding to a second TTI duration. The second and third control messages can be associated with a DCI format corresponding to a UL grant. The second control message in a fourth TTI can be decoded using the first DCI size. The second control message can include the second resource assignment. A third control message using the second DCI format can be received. The third, fourth, and fifth TTIs can be the same. At least two of the third, fourth, and fifth TTIs can be different. The third control message can include a set of control channel elements aggregated using a second aggregation level different from the first aggregation level. The third control message in a fifth TTI can be decoded using the second DCI size.

According to a possible implementation, the first control message can have a DCI size of X in bits. The second control message can have X1 non-padding bits and X2 padding bits such that X1+X2=X. The third control message can have non-padding bits and X3 padding bits such that X1+X3=Y, where Y<X, X3<X2, and X3 can be zero.

It should be understood that, notwithstanding the particular steps as shown in the figures, a variety of additional or different steps can be performed depending upon the embodiment, and one or more of the particular steps can be rearranged, repeated or eliminated entirely depending upon the embodiment. Also, some of the steps performed can be repeated on an ongoing or continuous basis simultaneously while other steps are performed. Furthermore, different steps can be performed by different elements or in a single element of the disclosed embodiments.

Figure 16:
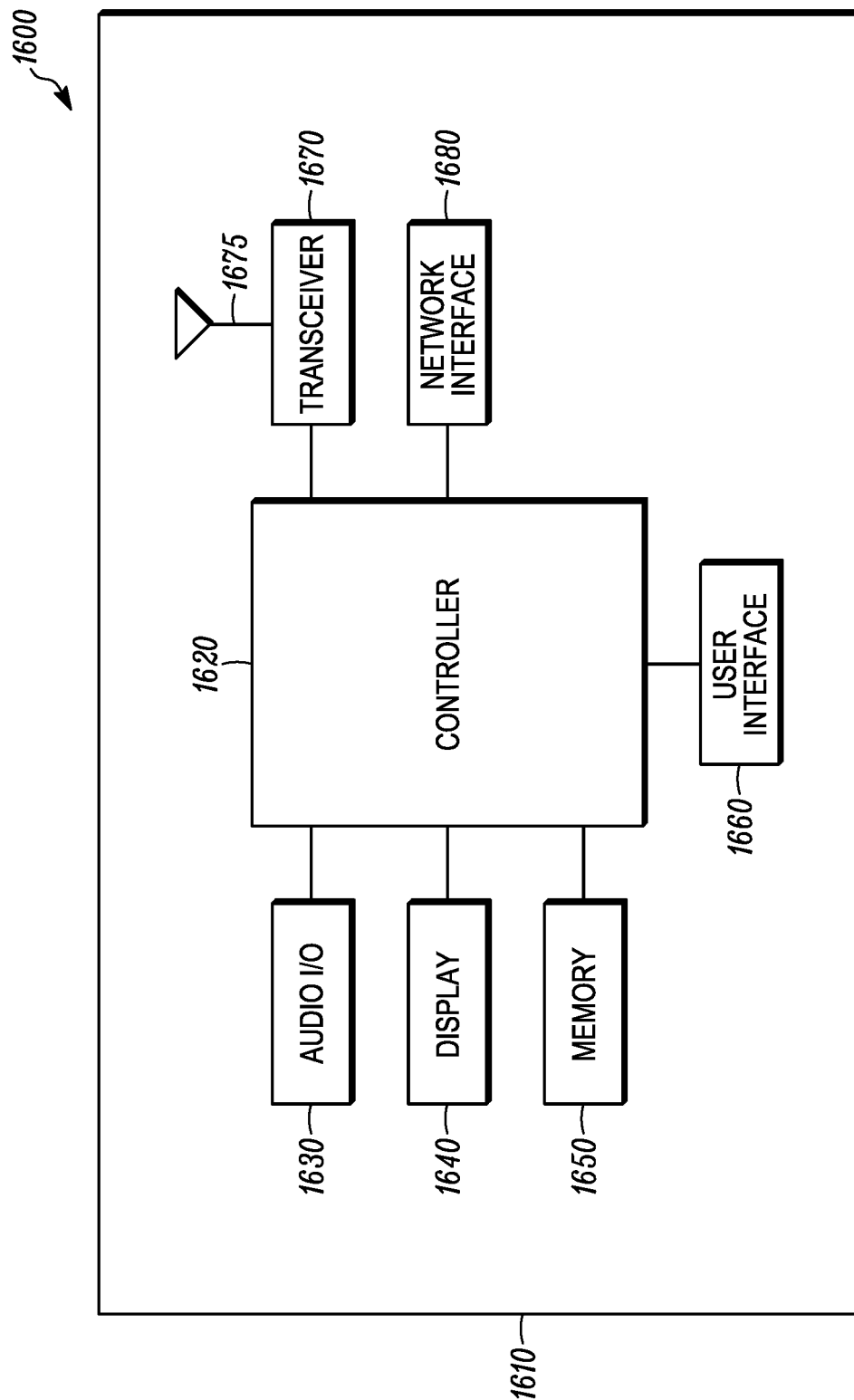
FIG. 16 is an example block diagram of an apparatus according to a possible embodiment.

FIG. 16 is an example block diagram of an apparatus 1600, such as the UE 110, the network entity 120, or any other wireless communication device disclosed herein, according to a possible embodiment. The apparatus 1600 can include a housing 1610, a controller 1620 coupled to the housing 1610, audio input and output circuitry 1630 coupled to the controller 1620, a display 1640 coupled to the controller 1620, a transceiver 1670 coupled to the controller 1620, at least one antenna 1675 coupled to the transceiver 1670, a user interface 1660 coupled to the controller 1620, a memory 1650 coupled to the controller 1620, and a network interface 1680 coupled to the controller 1620. The apparatus 1600 may not necessarily include all of the illustrated elements for different embodiments of the present disclosure. The apparatus 1600 can perform the methods described in all the embodiments.

The display 1640 can be a viewfinder, a Liquid Crystal Display (LCD), a Light Emitting Diode (LED) display, an Organic Light Emitting Diode (OLED) display, a plasma display, a projection display, a touch screen, or any other device that displays information. The transceiver 1670 can be at least one or more transceivers and include a transmitter and/or a receiver and can include. The audio input and output circuitry 1630 can include a microphone, a speaker, a transducer, or any other audio input and output circuitry. The user interface 1660 can include a keypad, a keyboard, buttons, a touch pad, a joystick, a touch screen display, another additional display, or any other device useful for providing an interface between a user and an electronic device. The network interface 1680 can be a Universal Serial Bus (USB) port, an Ethernet port, an infrared transmitter/receiver, an IEEE 1394 port, a WLAN transceiver, or any other interface that can connect an apparatus to a network, device, and/or computer and that can transmit and receive data communication signals. The memory 1650 can include a Random Access Memory (RAM), a Read Only Memory (RON), an optical memory, a solid state memory, a flash memory, a removable memory, a hard drive, a cache, or any other memory that can be coupled to an apparatus.

The apparatus 1600 or the controller 1620 may implement any operating system, such as Microsoft Windows®, UNIX®, or LINUX®, Android™, or any other operating system. Apparatus operation software may be written in any programming language, such as C, C++, Java or Visual Basic, for example. Apparatus software may also run on an application framework, such as, for example, a Java® framework, a .NET® framework, or any other application framework. The software and/or the operating system may be stored in the memory 1650 or elsewhere on the apparatus 1600. The apparatus 1600 or the controller 1620 may also use hardware to implement disclosed operations. For example, the controller 1620 may be any programmable processor. Disclosed embodiments may also be implemented on a general-purpose or a special purpose computer, a programmed microprocessor or microprocessor, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, the controller 1620 may be any controller or processor device or devices capable of operating an apparatus and implementing the disclosed embodiments. Some or all of the additional elements of the apparatus 1600 can also perform some or all of the operations of the disclosed embodiments.

According to a possible embodiment, the transceiver 1670 can receive a resource allocation assignment for a set of scheduled TTIs from a network in a first TTI belonging to the set of scheduled TTIs. The controller 1620 can determine, based on the resource allocation assignment, a first set of resources for receiving a first portion of a first downlink user data in the first TTI. The controller 1620 can determine, based on the resource allocation assignment, a second set of resources for receiving a second portion of the first downlink user data in the first TTI. The first set and the second set of resources may not overlap. The second set of resources can belong to a resource set configured for downlink control information. The transceiver 1670 can receive the first downlink user data corresponding to at least a first transport block in the first and the second set of resources in the first TTI. The controller 1620 can determine, based on the resource allocation assignment, a third set of resources for receiving a first portion of a second downlink user data in a second TTI belonging to the set of scheduled TTIs. The third set of resources in the second TTI can be the same as the first set of resources in the first TTI. The controller 1620 can determine, based on the resource allocation assignment, a fourth set of resources for receiving a second portion of the second downlink user data in the second TTI. The fourth set of resources is a subset of the second set of resources in the first TTI. The transceiver 1670 can receive the second downlink user data corresponding to at least a second transport block in the third and the fourth set of resources in the second TTI. The second TTI can be subsequent to the first TTI.

According to another possible embodiment, the transceiver 1670 can receive a first resource assignment in a first TTI. The controller 1620 can determine, based on the first resource assignment, a first set of resources for receiving a first portion of a first downlink user data in the first TTI. The controller 1620 can determine, based on the first resource assignment, a second set of resources for receiving a second portion of the first downlink user data in the first TTI. The second set of resources can be configured for downlink control information. The second set of resources may not overlap with the first set of resources. The controller 1620 can determine a resource location of a first demodulation reference signal associated with the first portion of the first downlink user data in the first set of resources. The controller 1620 can determine a resource location of a second demodulation reference signal associated with the second portion of the first downlink user data in the second set of resources. The transceiver 1670 can receive the first downlink user data corresponding to at least a first transport block from the network in the first TTI in the first and second set of resources. The controller 1620 can demodulate the first portion of the first downlink user data in the first set of resources based on the first DMRS. The controller 1620 can demodulate the second portion of the first downlink user data in the second set of resources. The second portion of the first downlink user data is demodulated based on the second DMRS.

The transceiver 1670 can receive a second resource assignment in a second TTI. The controller 1620 can determine, based on the second resource assignment, a third set of resources for receiving a first portion of a second downlink user data in the second TTI. The controller 1620 can determine, based on the second resource assignment, a fourth set of resources for receiving a second portion of the second downlink user data in the second TTI. The fourth set of resources can be configured for downlink control information. The fourth set of resources may not overlap with the third set of resources. The controller 1620 can determine a resource location of a third DMRS associated with the second portion of the second downlink user data in the fourth set of resources. The transceiver 1670 can receive the second downlink user data corresponding to at least a second transport block from the network in the second TTI in the third and fourth set of resources. The controller 1620 can demodulate the first portion of the second downlink user data based on the first DMRS. The controller 1620 can demodulate the second portion of the second downlink user data in the fourth set of resources based on at least the third DMRS. The second portion of the second downlink user data can also be demodulated based on the second and third DMRS.

The first set of resources in the first TTI can include a first set of resource blocks in the first TTI. The second set of resources in the first TTI can include a second set of RBs in the first TTI. The resource set configured for downlink control information in the first TTI can include at least the second set of RBs. The third set of resources in the second TTI can include a third set of RBs in the second TTI. The fourth set of resources in the second TTI can include a fourth set of RBs in the second TTI.

According to a possible implementation, the transceiver 1670 can receive the first resource assignment in at least a portion of the second set of resources in the first TTI. The transceiver 1670 can receive the second resource assignment in at least a portion of the fourth set of resources in the second TTI. The transceiver 1670 can receive the first downlink user data in the first and the second set of resources in the first TTI. The first downlink user data can be rate-matched around the at least the portion of the second set of resources corresponding to the received first resource allocation assignment. The transceiver 1670 can receive the second downlink user data in the third and the fourth set of resources in the second TTI, wherein the second downlink user data is rate-matched around the at least the portion of the fourth set of resources corresponding to the received second resource assignment.

According to another possible implementation, the controller 1620 can determine a first set of aggregation levels and a second set of ALs. The controller 1620 can monitor scheduling assignments in the first TTI and second TTI, based on the first and second sets of aggregation levels, a set of downlink DCI format sizes, and a set of uplink DCI format sizes. Monitoring can include monitoring at least one scheduling assignment candidate in a search space at a first AL of the first set of ALs in the first TTI and second TTI, according to a first DCI format size. The first DCI format size can be an element of both the set of DCI format sizes associated with downlink transmissions and the set of DCI format sizes associated with uplink transmissions. Monitoring can include monitoring at least one scheduling assignment candidate in a search space at a second AL of the second set of ALs in the first TTI and second TTI according to a second DCI format size. The second DCI format size can be an element of only one of the set of DCI format sizes associated with downlink transmissions and the set of DCI format sizes associated with uplink transmissions. The transceiver 1670 can receive the first resource assignment in one of the scheduling assignment candidates in the first TTI. The transceiver 1670 can receive the second resource assignment in one of the scheduling assignment candidates in the second TTI.

According to some embodiments for DMRS sharing, a method can include receiving a second resource allocation assignment in the second TTI. The method can also include receiving a second PDSCH in the first TTI. The method can also include determining a resource location of a DMRS signal in the second TTI associated with DL data transmissions, such as for a first PDSCH, in the second set of resources based on the first resource allocation assignment. The method can also include determining a resource location of a second DMRS in the second TTI associated with DL data transmissions, such as for a second PDSCH, in the third set of resources. The method can also include demodulating the DL data transmissions, such as for the first PDSCH, in the second set of resources based on the second DMRS. The method can also include demodulating the DL data transmissions, such as for the second PDSCH, in the first set of resources based on the first DMRS.

Some embodiments can include determining a first set of resources in a first TTI, where the first set of resources can include a first subset of resources and a second subset of resources, the first subset of resources may not include resources configured for control signaling reception in the first TTI, and the second subset of resources can include at least one resource configured for control signaling reception in the first TTI. A TTI can be a minimum unit of scheduling data for a user such as sTTI in reduced latency operation. A second set of resources in a second TTI can be determined, where the second set of resources can include a third subset of resources and a fourth subset of resources. The third subset of resources can be determined based on the frequency location of first subset of resources. The fourth subset of resources can be determined where the frequency location of at least one resource of the fourth subset is different from frequency location of at least one resource of the second subset. Data can be received in the first and second TTIs in the first and second sets of resources respectively.

Determining the first set of resources in the first TTI can include determining the first set of resources using a control signal received in the first TTI. Determining the third subset of resources based on the frequency location of first subset of resources can include determining the third subset of resources to have the same frequency location as the first subset of resources. Determining the third subset of resources based on the frequency location of first subset of resources can include determining the third subset of resources to have frequency locations derived based on a mapping from the first subset of resources.

Determining the fourth subset of resources can include determining the fourth subset of resources based on resources configured for control signaling reception in the second TTI. Determining the fourth subset of resources can include determining the fourth subset of resources based on a control signal received in the first TTI. For example, a bit in the DL assignment of first TTI can tell whether or not to replicate the reuse resources in other TTIs. Determining the fourth subset of resources can include determining the fourth subset of resources based on a control signal received in the second TTI. A grant or a group grant in the second TTI can tell whether or not a UE gets use the reuse resources or not. Determining the fourth subset of resources can include determining the fourth subset of resources such that the fourth subset of resources are a subset of the second subset of resources. Determining the fourth subset of resources can include determining the fourth subset of resources such that the second subset of resources are a subset of the fourth subset of resources. Determining the fourth subset of resources can include using a threshold based on fraction of reuse resources. Determining the fourth subset of resources can include using a time offset from the first TTI to determine whether the reuse is applicable or not.

Some embodiments can include determining a first set of resources in a first TTI. The first set of resources can include a first subset of resources and a second subset of resources. The first subset of resources may not include resources configured for control signaling reception in the first TTI. The second subset of resources can include at least one resource configured for control signaling reception in the first TTI. DL data transmissions can be received from a network in the first TTI in the first and second set of resources. A resource, including time and frequency, location of a first DMRS can be determined in the first TTI associated with the received DL data transmissions in the first set of resources. The DL data transmissions can be demodulated in the first set of resources based on the first DMRS. A second set of resources can be determined in a second TTI, the second set of resources including a third subset of resources and a fourth subset of resources. The fourth subset of resources can be determined where the frequency location of at least one resource of the fourth subset is different from frequency location of at least one resource of the second subset. DL data transmissions can be received from the network in the second TTI in the third and fourth subset of resources. A resource, including time and frequency location of a DMRS signal can be determined in the second TTI associated with DL data transmissions in the second set of resources. The DL data transmissions in the second set of resources can be demodulated based on the first DMRS and second DMRS. A TTI can be a minimum unit of scheduling data for a user such as TTI in reduced latency operation.

The second subset of resources can be an empty set. Determining the first set of resources in the first TTI can include determining the first set of resources using a control signal received in the first TTI. Determining the second set of resources in the second TTI can include determining the second set of resources using a control signal received in the second TTI. Determining the fourth subset of resources can include determining the fourth subset of resources based on resources configured for control signaling reception in the second TTI. Demodulating the DL data transmissions in the second set of resources based on the first DMRS and second DMRS can include demodulating the DL data transmissions in the third subset of resources based on the first DMRS and demodulating the DL data transmissions in the fourth subset of resources based on the second DMRS.

Some embodiments can include receiving a first control message using a first DCI format, the first control message comprising a set of control channel elements aggregated using a first aggregation level. A first DCI size can be assumed for decoding the first control message. A second control message using a second DCI format can be received. The second control message can include a set of control channel elements aggregated using the first aggregation level. The first DCI size can be assumed for decoding the second control message. A third control message using the second DCI format can be received, the third control message including a set of control channel elements aggregated using a second aggregation level different from the first aggregation level. A second DCI size different from the first DCI size can be assumed for decoding the third control message. The first control message can be associated with a DCI format corresponding to a DL assignment. The second and third control messages can be associated with a DCI format corresponding to an UL grant.

The control messages can be received in same or different TTIs/subframes/TTIs. The first control message can have DCI size X. The second control message can have X1 non-padding bits and X2 padding bits such that X1+X2=X. The third control message can have X/non-padding bits and X3 padding bits that X1+X3=Y, where Y<X and X3<X2 and X3 can be zero.

The method of this disclosure can be implemented on a programmed processor. However, the controllers, flow-charts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The phrase "at least one of," "at least one selected from the group of," or "at least one selected from" followed by a list is defined to mean one, some, or all, but not necessarily all of, the elements in the list. The terms "comprises," "comprising," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising." Furthermore, the background section is written as the inventor's own understanding of the context of some embodiments at the time of filing and includes the inventor's own recognition of any problems with existing technologies and/or problems experienced in the inventor's own work.

We claim:

1. A method in a network entity, the method comprising:
transmitting, to a user equipment, a first resource assignment in a first transmission time interval (TTI),
wherein the first resource assignment defines a first set of resources for receiving a first portion of a first downlink user data in the first TTI,
wherein the first resource assignment defines a second set of resources for receiving a second portion of the first downlink user data in the first TTI,
wherein the second set of resources are configured for Downlink Control Information and are used instead for downlink user data, and the second set of resources do not overlap with the first set of resources,
wherein the first set of resources define a resource location of a first demodulation reference signal (DMRS) associated with the first portion of the first downlink user data, and
wherein the first set of resources define a resource location of a second DMRS associated with the second portion of the first downlink user data;
transmitting, to the user equipment, the first downlink user data corresponding to at least a first transport block in the first TTI in the first and second set of resources,
wherein the first portion of the first downlink user data in the first set of resources is arranged to be demodulated based on the first DMRS, and
wherein the second portion of the first downlink user data is arranged to be demodulated based on the second DMRS;
transmitting, to the user equipment, a second resource assignment in a second TTI,
wherein the second resource assignment defines a third set of resources for receiving a first portion of a second downlink user data in the second TTI,
wherein the first and third set of resources are configured for downlink user data,
wherein the second resource assignment defines a fourth set of resources for receiving a second portion of the second downlink user data in the second TTI,
wherein the fourth set of resources is configured for Downlink Control Information and used instead for downlink user data, and the fourth set of resources do not overlap with the third set of resources, and
wherein the second resource assignment defines a resource location of a third DMRS associated with the second portion of the second downlink user data in the fourth set of resources; and
transmitting, to the user equipment, the second downlink user data corresponding to at least a second transport block, the second downlink user data transmitted in the second TTI in the third and fourth set of resources.

2. The method of claim 1, wherein the second set of resources and the fourth set of resources are configured by Radio Resource Control or a resource assignment for including user downlink data in a control region.

3. The method of claim 1, wherein the fourth set of resources further comprises an indication that indicates whether or not the third DMRS is present.

4. The method of claim 3, wherein if the indication indicates the third DMRS is present in the fourth set of resources, then the resource location of the third DMRS is determined by the user equipment.

5. The method of claim 1, wherein the first portion of the second downlink user data is arranged to be demodulated based on the first DMRS.

6. The method of claim 1, wherein the second portion of the second downlink user data is arranged to be demodulated based on at least the third DMRS.

7. The method of claim 1, wherein the first set of resources for receiving a first portion of a first downlink user data in the first TTI are rate matched around a short physical downlink control channel (sPDCCH).

8. A network entity comprising:
a controller arranged to control operations of the network entity; and
a transceiver coupled to the controller, where the transceiver is arranged to:
transmit, to a user equipment, a first resource assignment in a first transmission time interval (TTI),
wherein the first resource assignment defines a first set of resources for receiving a first portion of a first downlink user data in the first TTI,
wherein the first resource assignment defines a second set of resources for receiving a second portion of the first downlink user data in the first TTI,
wherein the second set of resources are configured for Downlink Control Information and are used instead for downlink user data, and the second set of resources do not overlap with the first set of resources,
wherein the first set of resources define a resource location of a first demodulation reference signal (DMRS) associated with the first portion of the first downlink user data, and
wherein the first set of resources define a resource location of a second DMRS associated with the second portion of the first downlink user data,
transmit, to the user equipment, the first downlink user data corresponding to at least a first transport block in the first TTI in the first and second set of resources,
wherein the first portion of the first downlink user data in the first set of resources is arranged to be demodulated based on the first DMRS, and
wherein the second portion of the first downlink user data is arranged to be demodulated based on the second DMRS,
transmit, to the user equipment, a second resource assignment in a second TTI,
wherein the second resource assignment defines a third set of resources for receiving a first portion of a second downlink user data in the second TTI,
wherein the first and third set of resources are configured for downlink user data,
wherein the second resource assignment defines a fourth set of resources for receiving a second portion of the second downlink user data in the second TTI,
wherein the fourth set of resources is configured for Downlink Control Information and used instead for downlink user data, and the fourth set of resources do not overlap with the third set of resources, and
wherein the second resource assignment defines a resource location of a third DMRS associated with the second portion of the second downlink user data in the fourth set of resources, and transmit, to the user equipment, the second downlink user data corresponding to at least a second transport block, the second downlink user data transmitted in the second TTI in the third and fourth set of resources.

9. The network entity of claim 8, wherein the second set of resources and the fourth set of resources are configured by Radio Resource Control or a resource assignment for including user DL data in a control region.

10. The network entity of claim 8, wherein the fourth set of resources further comprises an indication that indicates whether or not the third DMRS is present.

11. The network entity of claim 10, wherein if the indication indicates the third DMRS is present in the fourth set of resources, then the resource location of the third DMRS is determined by the user equipment.

12. The network entity of claim 8, wherein the first portion of the second downlink user data is arranged to be demodulated based on the first DMRS.

13. The network entity of claim 8, wherein the second portion of the second downlink user data is arranged to be demodulated based on at least the third DMRS.

14. The network entity of claim 8, wherein the first set of resources for receiving a first portion of a first downlink user data in the first TTI are rate matched around a short physical downlink control channel (sPDCCH).

* * * * *